US012809956B2

(12) United States Patent
Gaev et al.

(10) Patent No.: US 12,809,956 B2
(45) Date of Patent: Nov. 24, 2026

(54) METHOD AND A SYSTEM FOR IDENTIFYING A USER OF A MOBILE DEVICE

(71) Applicant: GROUP-IB GLOBAL PRIVATE LIMITED, Singapore (SG)

(72) Inventors: Andrey Victorovich Gaev, Moscow (RU); Dmitrij Arkadevich Yankelevich, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 193 days.

(21) Appl. No.: 18/620,373

(22) Filed: Mar. 28, 2024

(65) Prior Publication Data

US 2025/0103690 A1 Mar. 27, 2025

(30) Foreign Application Priority Data

Sep. 26, 2023 (RU) .......................... RU2023124661

(51) Int. Cl.
*G06F 21/31* (2013.01)
*G06F 21/55* (2013.01)

(52) U.S. Cl.
CPC .......... *G06F 21/316* (2013.01); *G06F 21/554* (2013.01); *G06F 2221/034* (2013.01)

(58) Field of Classification Search
CPC ................. G06F 21/316; G06F 21/554; G06F 2221/034
USPC ............................................................ 726/18
See application file for complete search history.

(56) References Cited

U.S. PATENT DOCUMENTS

| | | | |
|---|---|---|---|
| 10,075,846 B1 | 9/2018 | Acar et al. |
| 11,184,766 B1 | 11/2021 | Lord et al. |
| 11,223,619 B2 | 1/2022 | Turgeman |
| 11,706,215 B1 | 7/2023 | Rao et al. |

(Continued)

FOREIGN PATENT DOCUMENTS

| | | |
|---|---|---|
| RU | 2626337 C1 | 7/2017 |
| RU | 2691201 C1 | 6/2019 |

(Continued)

OTHER PUBLICATIONS

Shen et al., Performance Analysis of Motion-Sensor Behavior for User Authentication on Smartphones, Sensors 2016, 16, 345, pp. 1-21.

(Continued)

*Primary Examiner* — Jacob Lipman
(74) *Attorney, Agent, or Firm* — BCF LLP

(57) ABSTRACT

A method and a system for identifying a user of a mobile device. The method includes: receiving user identification data of the user; transmitting executable instructions to the mobile device, thereby causing the mobile device to generate, based on sensor readings of the mobile device a vector of behavioral parameters for further transmission thereof to a server; receiving the vector of behavioral parameters; aggregating respective vectors of behavioral parameters associated with the user into behavioral data; training, based on the behavioral data, a given classifier to determine whether in-use user interactions with the mobile device are performed by the user or not; and storing, in a database, the given classifier for further use in detecting a suspicious activity on the mobile device.

16 Claims, 6 Drawing Sheets

(56) References Cited

U.S. PATENT DOCUMENTS

| | | | | |
|---|---|---|---|---|
| 2002/0095586 | A1 | 7/2002 | Doyle et al. | |
| 2015/0121524 | A1* | 4/2015 | Fawaz | G06F 21/552 726/23 |
| 2015/0242605 | A1* | 8/2015 | Du | G06F 21/32 726/7 |
| 2016/0110528 | A1 | 4/2016 | Gupta et al. | |
| 2016/0239649 | A1 | 8/2016 | Zhao | |
| 2016/0337328 | A1 | 11/2016 | Sallam | |
| 2017/0227995 | A1* | 8/2017 | Lee | G06N 20/00 |
| 2018/0181741 | A1* | 6/2018 | Whaley | G06F 21/32 |
| 2020/0100104 | A1* | 3/2020 | Paeschke | G06F 21/316 |
| 2020/0327422 | A1* | 10/2020 | Novik | G06F 18/24323 |
| 2022/0350869 | A1* | 11/2022 | Progonov | G06F 11/3438 |

FOREIGN PATENT DOCUMENTS

| | | | | |
|---|---|---|---|---|
| RU | 2762535 | C1 | 12/2021 | |
| RU | 2786363 | C1 | 12/2022 | |
| RU | 2792586 | C1 | 3/2023 | |
| RU | 2801673 | C2 | 8/2023 | |
| RU | 2801674 | C2 | 8/2023 | |
| WO | WO-2020225819 | A1 * | 11/2020 | G06F 21/554 |

OTHER PUBLICATIONS

Priscila Morais Argôlo Bonfim Estrela et al., "A Framework for Continuous Authentication Based on Touch Dynamics Biometrics for Mobile Banking Applications", Sensors 2021, 21, 4212, pp. 1-27.

Search Report with regard to the counterpart SG Patent Application No. 10202401887Q completed Nov. 12, 2025.

Sitova et al., "HMOG: New Behavioral Biometric Features for Continuous Authentication of Smartphone Users", IEEE Transactions on Information Forensics and Security, vol. 11, No. 5, May 2016, pp. 877-882.

Search Report with regard to te counterpart RU Patent Application No. 2023124661 completed Jun. 18, 2024.

Abuhamad et al., "Sensor-based Continuous Authentication of Smartphones' Users Using Behavioral Biometrics: A Contemporary Survey", IEEE Internet of Things Journal, 2020, https://arxiv.org/pdf/2001.08578, pp. 1-19.

* cited by examiner

METHOD AND A SYSTEM FOR IDENTIFYING A USER OF A MOBILE DEVICE

CROSS-REFERENCE

The present application claims priority to a Russian patent application No.: 2023124661, filed on Sep. 26, 2023, and entitled "A PROCESS AND A SYSTEM FOR USER BEHAVIORAL PROFILING BASED ON ANALYSIS OF SIGNALS FROM SENSORS OF A MOBILE DEVICE," the content of which is incorporated herein by reference in its entirety.

FIELD

The present technology relates broadly to the field of cybersecurity; and in particular, to methods and systems for identifying a user of a mobile device.

BACKGROUND

In the field of information security of mobile devices, one of the most demanded tasks is a task of continuous user authentication. In other words, this includes establishing an identity of a user who currently works with the mobile device against a user whose the legitimate credentials (login and password) have been entered before the start of a given work session.

This task may apply to various fields of human activity and various software applications, such as mobile banking apps, as an example.

One of approaches to resolving said task is profiling user behavior. Generally, "behavioral profiling" denotes a process for continuous user authentication that usually consists of two main stages:

- Building of a behavioral profile during user interaction with a deliberately legitimate application (for example, a remote banking service (RBS) application), the behavioral profile characterizing a user's pattern of performing certain actions with the device on which the application is installed during work with the application, such as pushing buttons, making gestures, moving a cursor or the device itself, and the like. This behavioral profile can be stored for future use in association with user credentials of the legitimate user.
- Comparing actions taken by a current user during following work sessions on the same device and the same application with those specified in the stored behavioral profile, and if the actions that are being performed by the current user are considerably different from those defining the pre-stored behavioral profile, it may be determined that the activity of the current user is suspicious.

Certain prior art approaches disclose authentication methods using the behavioral profiling.

Russian patent No.: 2,801,673-C2, issued on Aug. 14, 2023, assigned to Group IB Ltd., and entitled "METHOD AND SYSTEM FOR USER IDENTIFICATION BY KEYBOARD TYPING PATTERN," discloses a method for identifying a user by keyboard typing pattern, which includes: registering the user's credentials in the system and assigning an identifier to the user; training the classifier to identify the user while the credentials are entered into the system from the keyboard a predetermined number of times and time intervals of keystrokes are measured during training; at each input, based on the measured time intervals, generating a user data set, which is assigned an identifier associated with the corresponding user; storing the generated data sets in a database; selecting the most stable features from the database using the selection algorithm; training the classifier to identify the user when entering credentials into the system based on the selected most stable features; and using the trained classifier to confirm the identity of the user entering the login credentials to the user on whose data sets the classifier was trained.

Russian patent No.: 2,801,674-C2, issued on Aug. 14, 2023, assigned to Group IB Ltd., and entitled "METHOD AND SYSTEM FOR USER IDENTIFICATION BY SEQUENCE OF OPENED WINDOWS OF THE USER INTERFACE," discloses a method of providing increased security in the identification of the user is achieved due to the fact that the identifier of the window that is currently open by the user, and the opening time of this window are saved; at each transition to a new window of the user interface, the identifier of this window and the opening time of this window are saved; a predetermined number of sessions of this user is accumulated; the accumulated data are analyzed, identifying repeated sequences of visited windows of the user interface (patterns); for each detected pattern, a set of parameters is calculated that characterizes the time elapsed between transitions of a given user from window to interface window; storing a predetermined number of patterns of the given user and, based on the set of parameters calculated for each pattern, at least one classifier is trained to identify the given user by the sequence of visited pages; the trained classifier is used to subsequently confirm the identity of the user during whose work sessions the classifier was trained. Further. Russian patent No.: 2792586-C1, issued on Mar. 22, 2023, assigned to Group IB Ltd., and entitled "METHOD AND SYSTEM FOR USER IDENTIFICATION USING CURSOR TRAJECTORY," discloses a method, wherein the user's credentials are registered in a system, a user identifier corresponding to the credentials is assigned, a trajectory of a mouse cursor is analyzed throughout the entire session of the identified user, for each position of the cursor mice, vertical and horizontal coordinates of the mouse cursor and a time stamp are recorded, a sequence of mouse cursor coordinates and the corresponding timestamps are saved, the recorded sequence is analyzed to find points to split the mouse cursor trajectory into fragments, a list of fragments of the cursor trajectory during the session of a given user is formed, for each fragment of the cursor trajectory, a set of predetermined features is calculated and stored in a database, at least one trained classifier for further confirmation of the user's identity is applied. The method is described as applied to a desktop computer having a separate mouse, but it also can be adapted to a mobile device having a touchscreen.

Also, an article entitled "Performance Analysis of Motion-Sensor Behavior for User Authentication on Smartphones," authored by Shen et. al, and published by School of Electronic and Information Engineering, Xi'an Jiaotong University on Mar. 9, 2016 describes a study of a possibility and applicability of using a behavior data of motion sensors for authentication of users on smartphones. The sensor data is analyzed for each password sample in order to retrieve descriptive and intensive functions to ensure a precise and detailed characterization of user actions on entering the password. Single-class training methods are applied to a space of functions for performing authentication of users. The analysis is conducted using data from 48 participants with 129621 samples of passwords in different usage scenarios and on different types of smartphones. Experiments on usage convenience of the provided approach at different lengths of the password, sensitivity to a size of a training sample, scalability of a number of users and flexibility relative to a screen size, are described.

Further, an article entitled “A Framework for Continuous Authentication Based on Touch Dynamics Biometrics for Mobile Banking Applications,” authored by Priscila Morais Argôlo Bonfim Estrela et. al, published in Cybersecurity INCT Unit 6, Decision Technologies Laboratory—LATITUDE, Electrical Engineering Department, Technology College, University of Brasília on Jun. 19, 2021, discloses improving Biotouch, a framework for continuous user authentication based on machine learning technologies. A general contribution of this article is to suggest using several iterations of collection of data from sensors in order to create more stable behavioral profiles and to form corresponding data sets for the improved structure of the Biotouch framework.

Further, U.S. Pat. No. 11,184,766-B1, issued on Nov. 23, 2021, assigned to Locurity Inc., and entitled “SYSTEMS AND METHODS FOR CONTINUOUS AUTHENTICATION, IDENTITY ASSURANCE AND ACCESS CONTROL” a system that maintains and enforces assertions about a user’s intent and identity at a point of access (for example, a computer system being used to access a service, system, cloud, etc.). In one example, the system includes lightweight browser components and mobile and/or desktop agents that communicate in the background with a cloud-based authentication service. The system integrates seamlessly with enterprise applications, cloud services, multi-factor authentication solutions and existing identity management solutions. In one example, the system includes protocols, application programming interfaces, etc. that facilitate integration with standards such as Fast Identity Online (“FIDO”) Universal Authentication and OpenID Connect. In one example, the system includes protocols, application programming interfaces, etc. that facilitate integration with existing widely adopted SMS/Phone call or One Time Passcode (OTP) based multi-factor solutions so such system can be integrated with existing enterprise infrastructure with minimal efforts.

Finally, U.S. Pat. No. 11,223,619-B2, issued on Jan. 11, 2022, assigned to BioCatch Ltd., and entitled “DEVICE, SYSTEM, AND METHOD OF USER AUTHENTICATION BASED ON USER-SPECIFIC CHARACTERISTICS OF TASK PERFORMANCE,” discloses devices, systems, and methods for determining a user’s identity, authenticating the user in a computerized service or an electronic device, differentiating users of the computerized service, and detecting possible intruders or possible fraudulent transactions. The method comprises: creating a user authentication session that requires a user to enter a secret data item by performing a task; monitoring an interaction between the users while performing the tasks; retrieving user-specific behavioral characteristics and using the same as a user authentication factor. The user is required to perform operations on a screen by means of a touchscreen or a touch panel, a mouse or another input device of the electronic device, as well as to spatially move or tilt the entire electronic device so as to cause input of data of the secret data item.

SUMMARY

It is an object of the present technology to ameliorate at least some of the inconveniences associated with the prior art.

The non-limiting embodiments of the methods and systems described herein are directed to determining a user behavioral profile of the user of the mobile device through analyzing sensor readings of at least one sensor (such as an accelerometer or gyroscope) of the mobile device. More specifically, output signals of the sensors built in the mobile device can be received in a digital format and cannot be received by applications, for example, such as an RBS application, installed on the mobile device. A polling interval of the sensors, i.e., a rate of returning values by each sensor, is usually standardized and defined by possibilities of the user device and operating system. Interfaces supported by the sensors are also standardized. At the same time, a list of sensors that are installed and available on this mobile device may be received via a system API of an operating system of the mobile device.

Unlike some of the above-reviewed prior art approaches using the sensor reading for profiling user behavior, at least some non-limiting embodiments of the present technology do not require the user to perform any specific interactions to determine their behavioral profile. More specifically, in contrast with the prior art approaches, the presently disclosed methods and systems include generating and further analyzing sensed data for each occurrence of a synchronization event performed on the mobile device, wherein the synchronization event can include, for example the user touching a touchscreen of the mobile device. Further, the present methods are directed to clustering the so sensed data sensed over a plurality of occurrences of the same synchronization event in accordance with a respective interaction mode (defined, for example, by a different position of the mobile device relative to the user) of the user with the mobile device for further training a respective classifier to determine suspicious activity on the mobile device.

More specifically, in accordance with a first broad aspect of the present technology, there is provided a computer-implemented method for identifying a user of a mobile device. The method is executable by one or more server communicatively coupled with the mobile device. The method comprises: receiving (i) user identification data of the user including: a user login and a user password associated with the user; and (ii) a device identifier of the mobile device; transmitting executable instructions to the mobile device, thereby causing the mobile device to execute: retrieving a list of sensors available on the mobile device; selecting, from the list of sensors, at least one available sensor; iteratively polling the at least one available sensor for generating sensed data for a given occurrence of a synchronization event, the sensed data being indicative of user interactions of the user with the mobile device; analyzing the sensed data to generate a vector of behavioral parameters; and transmitting the vector of behavioral parameters to the one or more server; receiving the vector of behavioral parameters; aggregating respective vectors of behavioral parameters associated with the user and generated by the at least one available sensor over other occurrences of the synchronization event into behavioral data; clustering a given behavioral parameter within the behavioral data into a respective cluster of a plurality of clusters based on a respective interaction mode of a predetermined plurality of interaction modes of the user with the mobile device at a respective occurrence of the synchronization event, responsive to which the given behavioral parameter was generated; training, based on behavioral parameters of the respective cluster, a given classifier to determine whether in-use user interactions with the mobile device are performed by the user or not; and storing, in a database, the given classifier in association with the user identification data of the user, the device identifier of the mobile device, and the respective interaction mode associated with the given classifier for further use in detecting a suspicious activity on the mobile device.

In some implementations of the method, the at least one available sensor of the mobile device is one of: an accelerometer; a gyroscope; and a gravity sensor.

In some implementations of the method, the synchronization event comprises the user tapping on a touchscreen of the mobile device.

In some implementations of the method, the synchronization event comprises one of opening a new window in an application interface, in which the user has input the user login and the user password.

In some implementations of the method, the synchronization event comprises both of the user tapping on a touchscreen of the mobile device and opening a new window in an application interface, in which the user has input the user login and the user password.

In some implementations of the method, the generating the sensed data comprises: retrieving first data sensed by the at least available sensor prior to a given occurrence of the synchronization event; retrieving second data sensed by the at least available sensor prior during the given occurrence of the synchronization event; and retrieving third data sensed by the at least available sensor after the given occurrence of the synchronization event.

In some implementations of the method, the first data includes a first number of sensor readings of the at least one available sensor sensed prior to the given occurrence of the synchronization event; the second data includes all sensor readings of the at least one available sensor sensed during the given occurrence of the synchronization event; and the third data includes a second number of sensor readings sensed after termination of the given occurrence of the synchronization event.

In some implementations of the method, the vector of behavioral parameters includes one or more of: a minimum value (min) of sensor readings of the at least one available sensor in an entirety of the sensed data; a minimum value among amplitudes (amp·min) of the sensor readings in the entirety the sensed data; a minimum value (minS) of the sensor readings of the at least one available sensor in the sensed data sensed prior to the given occurrence of the synchronization event; a minimum value (minF) of the sensor readings of the at least one available sensor in the sensed data sensed after the given occurrence of the synchronization event; a maximum value (maxS) of the sensor readings of the at least one available sensor in the sensed data sensed prior to the given occurrence of the synchronization event; a maximum value among the amplitudes (amp·maxS) of the sensor readings of the at least one available sensor in the sensed data sensed prior to the given occurrence of the synchronization event; a maximum value (maxA) of the sensor readings of the at least one available sensor in the sensed data sensed during the given occurrence of the synchronization event; a maximum value among the amplitudes (amp·maxA) of the sensor readings of the at least one available sensor in the sensed data sensed during the given occurrence of the synchronization event; a maximum value (maxF) of the sensor readings of the at least one available sensor in the sensed data sensed after the given occurrence of the synchronization event; a maximum value among the amplitudes (amp·maxF) of the sensor readings of the at least one available sensor in the sensed data sensed after the given occurrence of the synchronization event; a variance (var) of the sensor readings of the at least one available sensor in the entirety of the sensed data; a variance of the amplitudes (amp·var) of the sensor readings the at least one available sensor in the entirety of the sensed data; a standard deviation (std) of the sensor readings of the at least one available sensor in the entirety of the sensed data; a standard deviation of the amplitudes (amp·std) of the at least one available sensor in the entirety of the sensed data; an arithmetic mean (mean) of the sensor readings of the at least one available sensor in the entirety of the sensed data; an arithmetic mean of the amplitudes (amp·mean) of the sensor readings the at least one available sensor in the entirety of the sensed data; a median (median) of the sensor readings of the at least one available sensor in the entirety of the sensed data; a median of the amplitudes (amp·median) of the sensor readings the at least one available sensor in the entirety of the sensed data; a ratio between the maximum values of maxS and maxA; a ratio between the maximum values of amp·maxS and amp·maxA; a ratio between the maximum values of maxF and maxA; a ratio between the maximum values of amp·maxF and amp·maxA;

a value of an oscillation parameter of the mobile device prior to the given occurrence of the synchronization event (diffS); a value of the oscillation parameter of the mobile device after termination of the given occurrence of the synchronization event (diffF); and a difference of the values of the oscillation parameter of the mobile device prior to and after the termination of the given occurrence of the synchronization event (ratioSF).

In some implementations of the method, the clustering the given behavioral parameter is further based on values of an arithmetic mean value (mean) of sensor readings of the at least one available sensor.

In some implementations of the method, the at least one available sensor is a gravity sensor of the mobile device.

In some implementations of the method, prior to the clustering, the method further comprises determining an orientation of a screen of the mobile device as being one of portrait and landscape.

In some implementations of the method, the clustering the given behavioral parameter is further based on the values of a median (median) of the sensor readings of the at least one available sensor.

In some implementations of the method, the at least one available sensor is a gravity sensor of the mobile device.

In some implementations of the method, prior to the clustering, the method further comprises determining an orientation of a screen of the mobile device as being one of portrait and landscape.

In some implementations of the method, the predetermined plurality of interaction modes of the user with the mobile device comprises: (i) a first interaction mode while the user is in a standing position, (ii) a second interaction mode while the user is in a lying position; and (iii) a third interaction mode while the suer is in a sitting position.

In some implementations of the method, the given classifier comprises a OneClass SVM classifier.

In some implementations of the method, the method further comprises using the given classifier for identifying the user of the mobile device by analyzing a current activity thereon, the using comprising: causing the mobile device to execute: iteratively polling the at least one available sensor for generating in-use sensed data for a given in-use occurrence of the synchronization event, the in-use sensed data being indicative of current user interactions with the mobile device; analyzing the in-use sensed data to generate an in-use vector of behavioral parameters; and transmitting the in-use vector of behavioral parameters to the one or more server; based on the in-use vector of behavioral parameters, determining, a current interaction mode of the predetermined plurality of interaction modes with the mobile device; searching the database to identify a respective classifier corresponding to the current interaction mode with the mobile device; in response to failing to identify the respective classifier corresponding to the current interaction mode: determining the current activity on the mobile device as being suspicious; and causing execution of remedial actions against the suspicious activity; in response to identifying the respective classifier corresponding to the current interaction mode: applying the respective classifier to the in-use vector of behavioral parameters to generate a likelihood value representative of a likelihood of the current activity being suspicious; in response to the likelihood value being greater than a predetermined likelihood threshold: determining the current activity on the mobile device as being suspicious; and causing execution of the remedial actions against the suspicious activity.

Further, in accordance with a second broad aspect, there is provided a system for identifying a user of a mobile device. The system comprises a server communicatively coupled with the mobile device. The server comprises at least one processor and at least one non-transitory computer-readable memory storing executable instructions, which, when executed by the at least one processor, cause the system to: receive (i) user identification data of the user including: a user login and a user password associated with the user; and (ii) a device identifier of the mobile device; transmit executable instructions to the mobile device, thereby causing the mobile device to execute: retrieving a list of sensors available on the mobile device;

selecting, from the list of sensors, at least one available sensor; iteratively polling the at least one available sensor for generating sensed data for a given occurrence of a synchronization event, the sensed data being indicative of user interactions of the user with the mobile device; analyzing the sensed data to generate a vector of behavioral parameters; and transmitting the vector of behavioral parameters to the one or more server; receive the vector of behavioral parameters; aggregate respective vectors of behavioral parameters associated with the user and generated by the at least one available sensor over other occurrences of the synchronization event into behavioral data; cluster a given behavioral parameter within the behavioral data into a respective cluster of a plurality of clusters based on a respective interaction mode of a predetermined plurality of interaction modes of the user with the mobile device at a respective occurrence of the synchronization event, responsive to which the given behavioral parameter was generated; train, based on behavioral parameters of the respective cluster, a given classifier to determine whether in-use user interactions with the mobile device are performed by the user or not; and store, in a database, the given classifier in association with the user identification data of the user, the device identifier of the mobile device, and the respective interaction mode associated with the given classifier for further use in detecting a suspicious activity on the mobile device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

Figure 1:
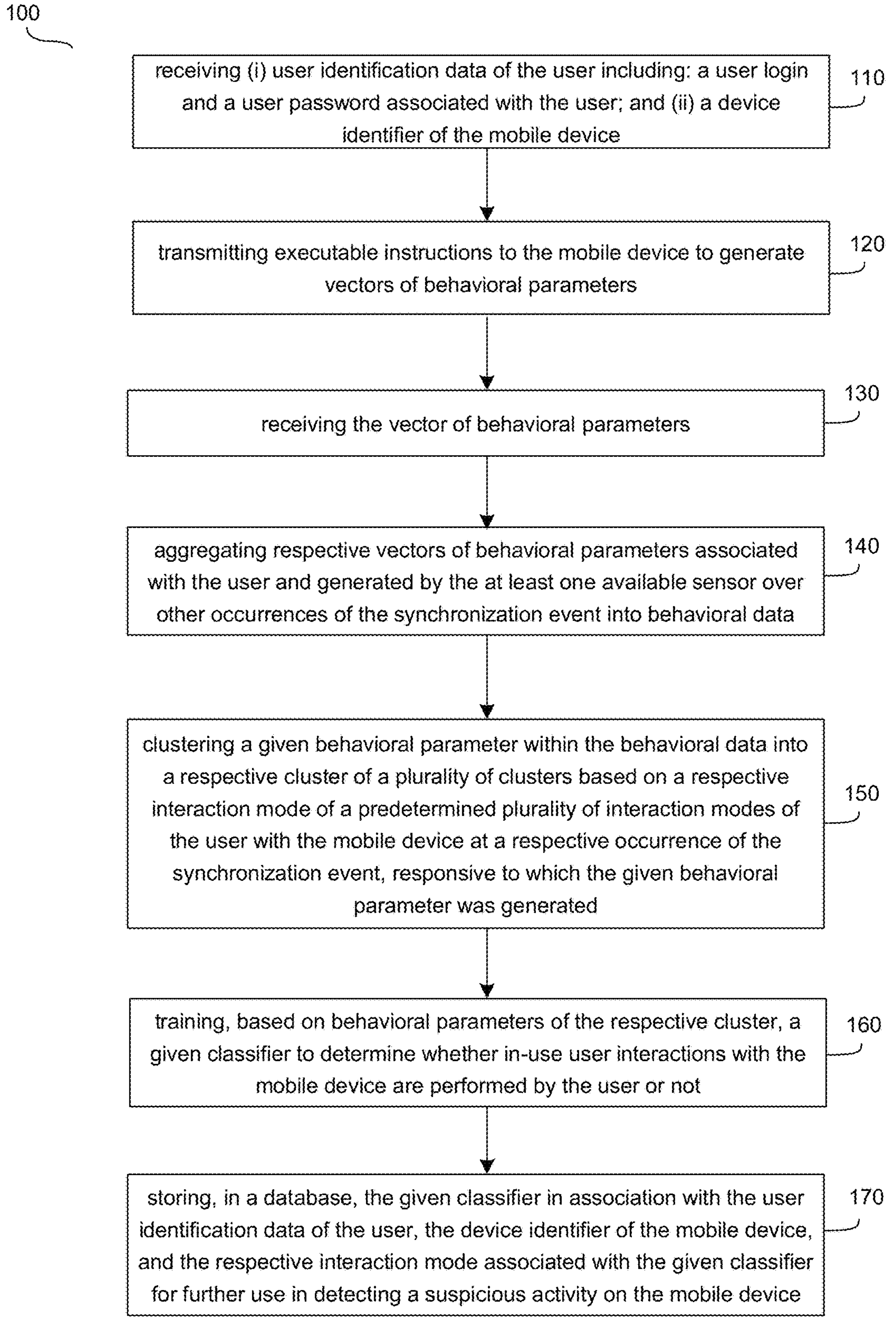
FIG. 1 depicts a flowchart diagram of a first phase of a present method for training classifiers for identifying suspicious activity on a mobile device present in a system of FIG. 2, in accordance with certain non-limiting embodiments of the present technology.
Figure 2:
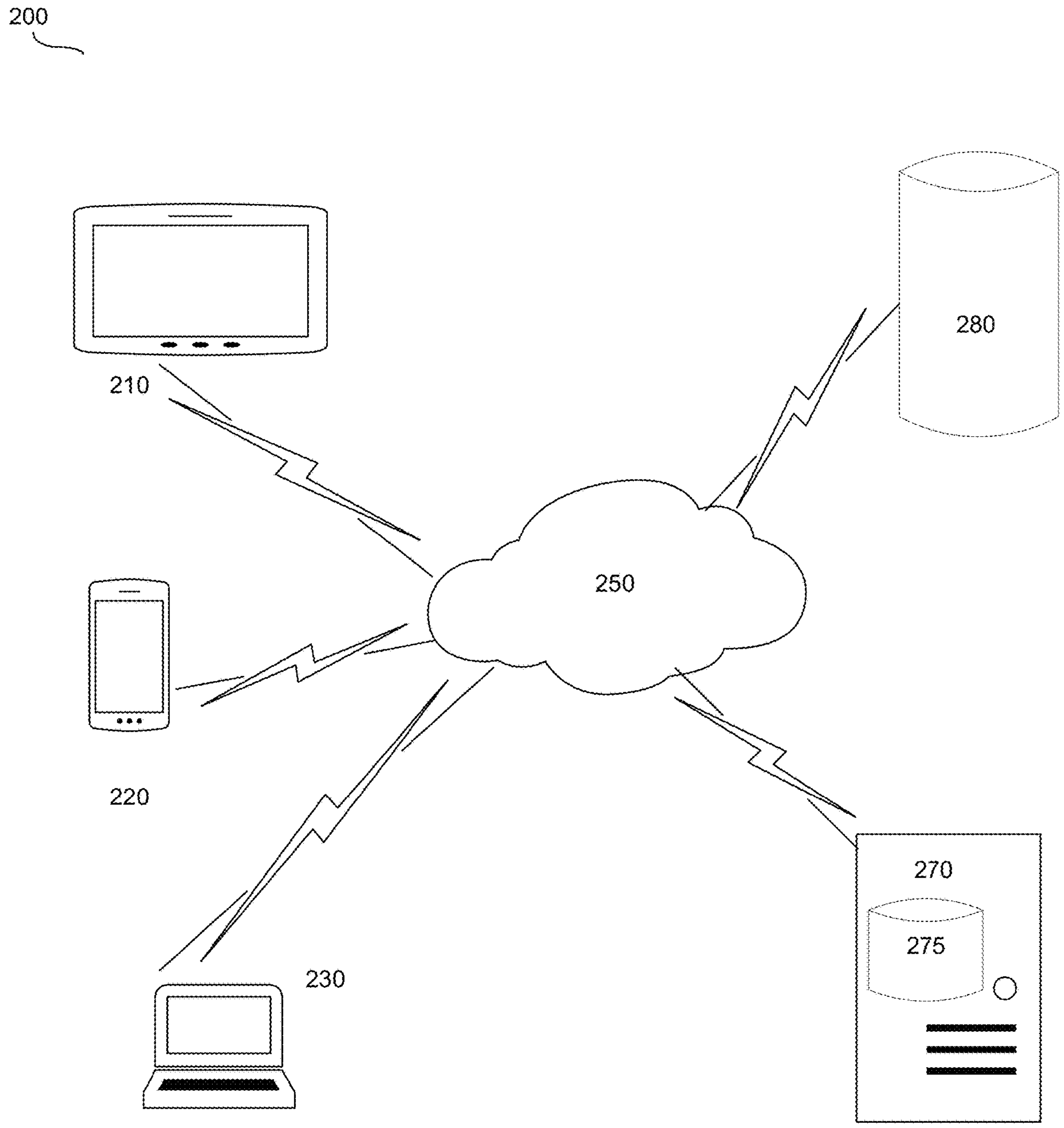
FIG. 2 depicts a schematic diagram of the system suitable for being used with certain non-limiting embodiments of the present technology.
Figure 4A:
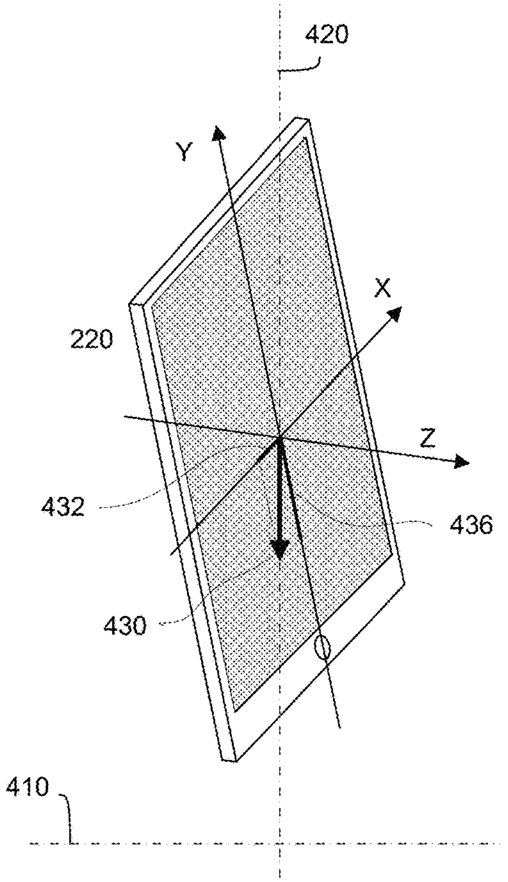
FIGS. 4A and 4B schematically illustrate example orientations of the mobile device present in the system of FIG. 2 and positions of coordinate axes corresponding thereto, in accordance with certain non-limiting embodiments of the present technology.
Figure 4B:
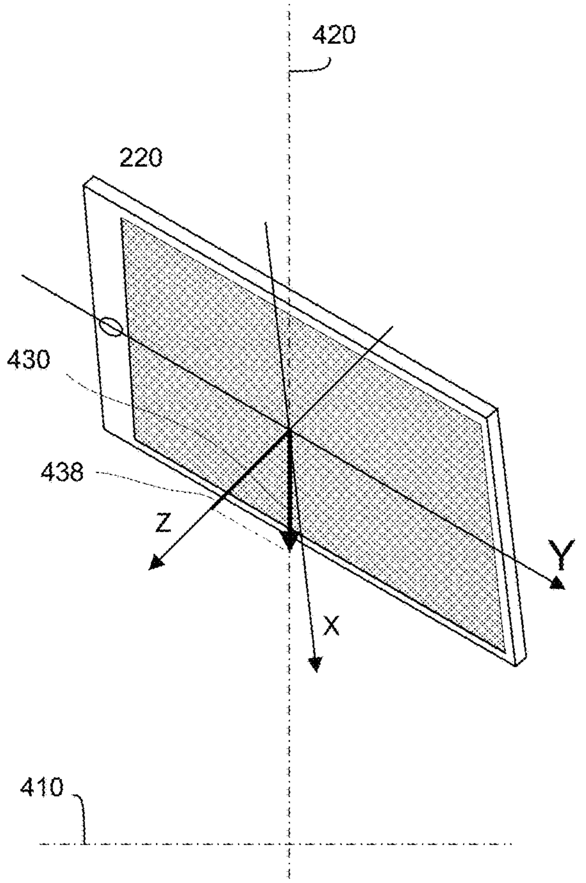
Figure 4C:
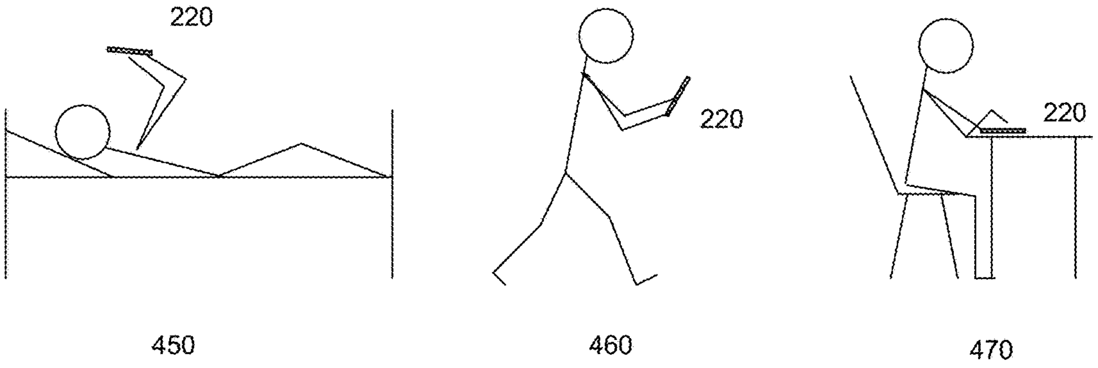
Figure 5:
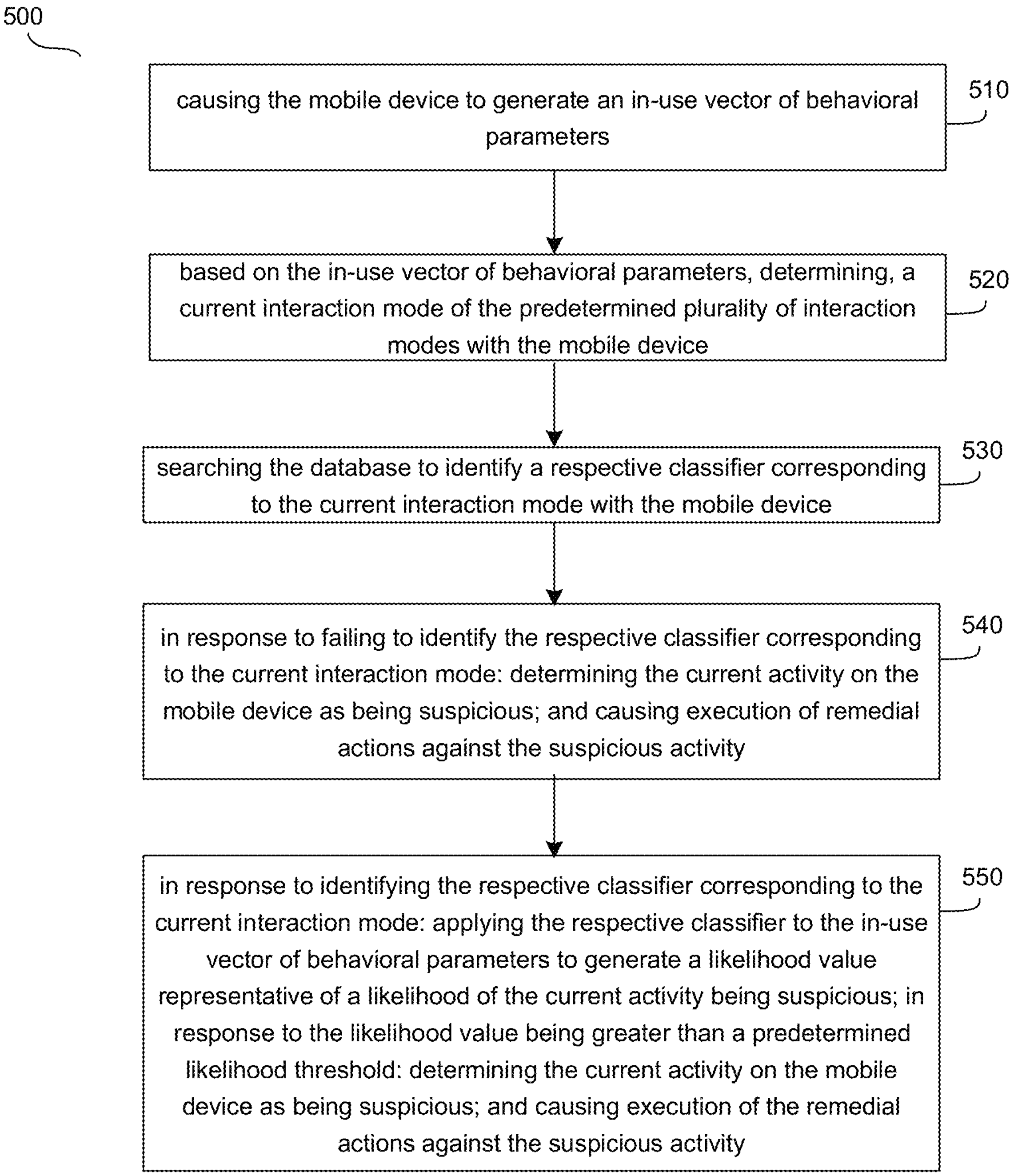
Figure 6:
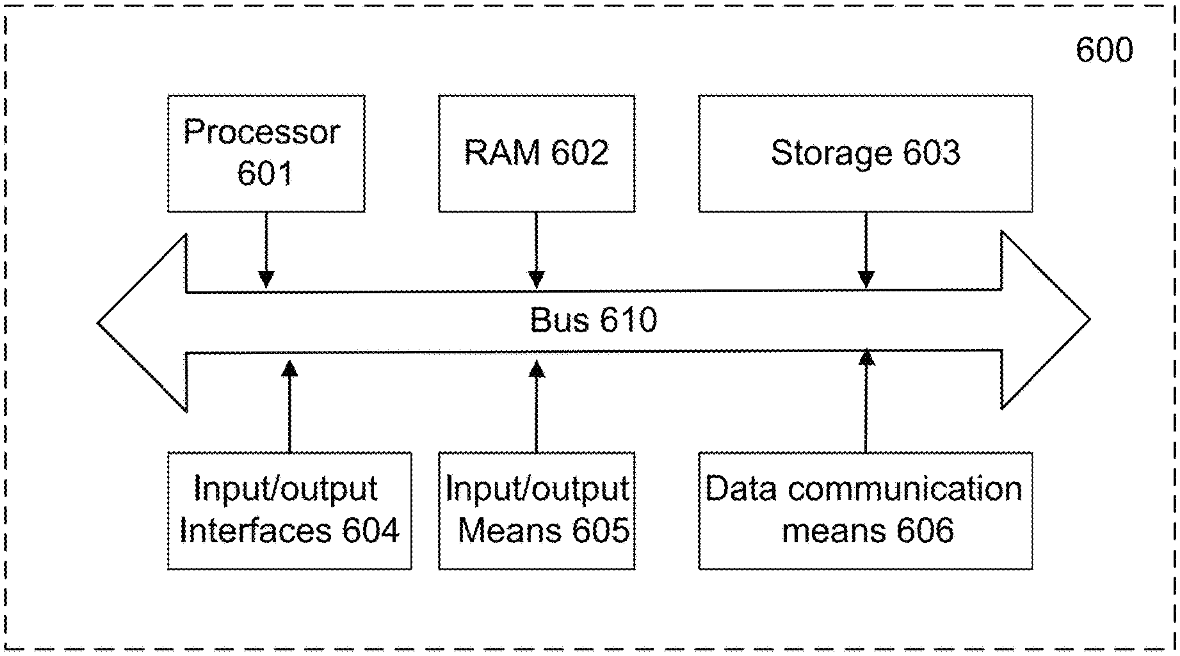

FIG. 4C schematically depict example positions of the user of the mobile device defining various interaction modes therewith, in accordance with certain non-limiting embodiments of the present technology;

FIG. 5 depicts a flowchart diagram of a second phase of the present method for using the trained classifiers for identifying the suspicious activity on the mobile device present in the system of FIG. 2, in accordance with certain non-limiting embodiments of the present technology; and FIG. 6 depicts a schematic diagram of an example computing environment configurable for execution of the first and second phases of the present method of FIGS. 1 and 5, respectively, in accordance with certain non-limiting embodiments of the present technology.

DETAILED DESCRIPTION

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to methods and systems for identifying a user of mobile device by profiling user behavior of the user based on analysis of signals from sensors of the mobile device. A technical effect of the present technology can be in increasing the accuracy of continuous user authentication during the entire working session of the user with a given application.

With reference to FIG. 2, there is depicted a schematic diagram of a system 200 which can be used with certain non-limiting embodiments of the present technology. According to certain non-limiting embodiments of the present technology, the system 200 comprises a mobile device that is configured to communicate with a server 270 via a computing network 250.

According to certain non-limiting embodiments of the present technology, the mobile device may comprise an electronic device capable of implementing a given task at hand. For example, in various non-limiting embodiments of the present technology, the mobile device can comprise a tablet 210, a smartphone 220, a netbook 230, a touchscreen tablet with a keyboard connected thereto, or another similar device. To that end, the mobile device can include some or all components of a computing environment 600, which will be described below with reference to FIG. 6.

Further, according to certain non-limiting embodiments of the present technology, the server 270 can be implemented as a computer server, such as Dell™ PowerEdge™ Server running the Microsoft™ Windows Server™ operating system but can also be implemented in any other suitable hardware, software, and/or firmware, or a combination thereof. In this regard, the server 270 can also include some or all components of the computing environment 600. In some non-limiting embodiments of the present technology, the server 270 can be implemented as a single server. In other non-limiting embodiments of the present technology, the functionality of the server 270 can be distributed over a plurality of similarly implemented servers.

In some non-limiting embodiments of the present technology, the server 270 can be associated with a mobile application that has been pre-installed and executed on the mobile device.

With reference to FIG. 1, there is depicted a flowchart diagram of a first phase 100 of the present method for identifying the user of the mobile device, in accordance with certain non-limiting embodiments of the present technology. According to certain non-limiting embodiments of the present technology, the first phase 100 is directed to training one or more classifiers for determining suspicious behavior of the user with the mobile device based on analyzing user interactions with the user. According to certain non-limiting embodiments of the present technology, the first phase 100 can be executed by the server 270.

Step 110: Receiving (I) User Identification Data of the User Including: A User Login and a User Password Associated with the User; and (II) a Device Identifier of the Mobile Device The first phase 100 of the present method starts at step 110 with the server 270 being configured to receive, from the mobile device, user identification of the user including legitimate credentials thereof that the user has input to the installed application, thereby launching a first session on this mobile device.

Further, the server 270 can be configured to receive, from the mobile device, a device identifier of the mobile device 210-230 wherefrom these credentials have been received. For example, the device identifier of the mobile device can include an International Mobile Equipment Identity (IMEI) of the mobile device. Using this identifier, the server 270 can be configured to determine whether any behavioral profile of the user already exists and whether any other previous sessions from this mobile device are known by transmitting respective requests to a database 275 that is hosted on the server 270 or to an external database 280 that is, for example, located in cloud storage.

If the server 270 has determined that this user already has a behavioral profile that has been generated according to the methods and systems described herein, then the present method will proceed to step 510 of a second phase 500 of the present method that will be described herein below with reference to FIG. 5.

However, in response to failing to retrieve, for example, from the database 275, the behavioral profile of the user, in some non-limiting embodiments of the present technology, the server 270 can be configured to determine that sessions executed on this mobile device already occurred, which may denote that this device has a plurality of available sensors thereon that are already known to the server 270. In this case, according to certain non-limiting embodiments of the present technology, the server 270 can be configured to transmit instructions to the mobile device causing the mobile device to poll at least one available sensor (that has already been polled before) for generating sensed data as will be described hereinbelow.

However, in a given example where the user logs in the application for the first time, the server 270 can be configured to determine that there is no record of any prior session of the application on the mobile device. In this regard, the first phase 100 of the present method also proceeds to step 120 described immediately below.

Step 120: Transmitting Executable Instructions to the Mobile Device to Generate Vectors of Behavioral Parameters At step 120, according to certain non-limiting embodiments of the present technology, the server 270 can be configured to transmit to the mobile device of the user the executable instructions to cause the mobile device to generate vectors of behavioral parameters associated with the user.

To do so, once the mobile device has received the executable instructions from the server 270, the executable instructions first cause the mobile device to retrieve a list of sensors that are installed and available. According to certain non-limiting embodiments of the present technology, the list of available sensors can include, without limitation:

Accelerometer,
Gyroscope (gyro),
Gravity sensor,
Proximity sensor,
Light sensor,
Step detector, and
Step counter.

It should be understood that the list of available sensors may differ depending on a particular type and model of the mobile device.

If the mobile device returns no available sensors, the first phase 100 of the present method will terminate and no behavioral profile will be determined, since the absence of at least one available sensor that is suitable for the profiling renders the mobile device unsuitable for the profiling by the method described herein.

Also, it should be noted that most mobile devices that are equipped with a touchscreen have an internal flag (a signal having a binary value, i.e., 0 or 1) that is triggered (takes the state 1) when the screen is touched (tapped on) and that is reset (takes the state 0) when there is no touching of the screen.

Although, from a technical perspective, this flag is not triggered by certain individual sensors, but rather by structural elements of the touchscreen itself, so, for the sake of simplicity, in the context of the present specification, a circuit of generation of said flag will be called "a screen tapping sensor". Thus, the touchscreen can be considered as a separate sensor of the mobile device and can also be polled for generating the vectors of behavioral parameters associated with the user.

For example, in some non-limiting embodiments of the present technology, caused by the executable instructions, the mobile device can be configured to identify the list of available sensors, which can include, for example:

an accelerometer,
a gyroscope, and
a gravity sensor,

Further, the executable instructions transmitted by the server 270 can cause the mobile device to select, from the list of available sensors, at least one available sensor, that is, one of: the accelerometer, the gyroscope, and the gravity sensor.

Further, in some non-limiting embodiments of the present technology, the executable instructions transmitted by the server 270 can cause the mobile device to iteratively poll the at least one selected sensor to generate sensed data for a given occurrence of a synchronization event.

Figure 3:
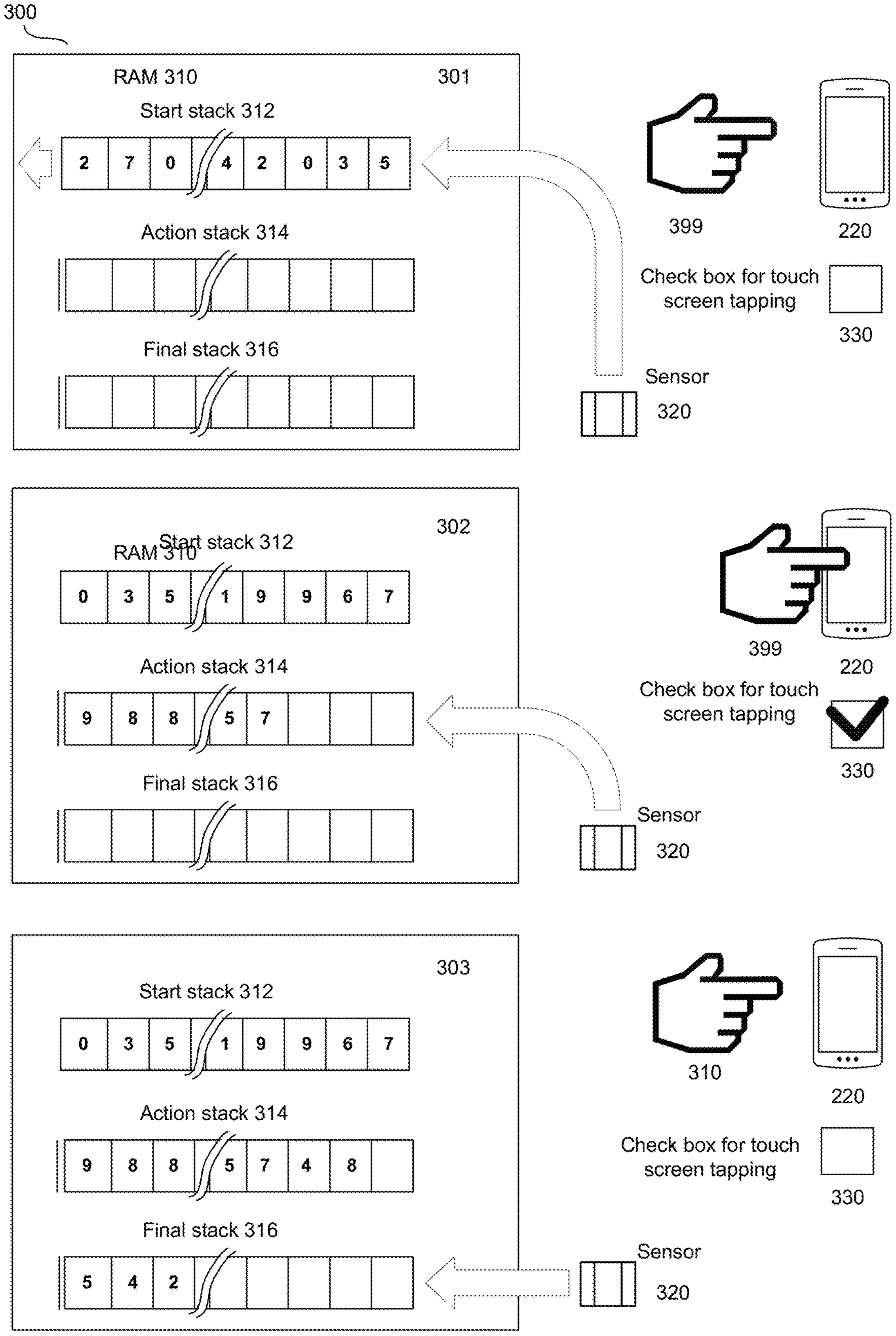
FIG. 3 depicts a schematic diagram of generating sensed data of a given sensor of a mobile device present in the system of FIG. 2 for a given occurrence of a synchronization event, in accordance with certain non-limiting embodiments of the present technology.

With reference to FIG. 3, there is depicted a schematic diagram of generating the sensed data of a sensor 320 for the given occurrence of a synchronization event 302, in accordance with certain non-limiting embodiments of the present technology.

According to certain non-limiting embodiments of the present technology, the synchronization event 302 can comprise user touching/tapping on the touchscreen of the mobile device.

In order to provide synchronization 300 in a RAM 310 of the mobile device, such as the smartphone 220, in some non-limiting embodiments of the present technology, the server 270 can be configured to cause the mobile device to create three memory areas including: a start stack 312, an action stack 314, and a final stack 316 for each of channels of each of the polled sensors, such as the sensor 320, corresponding to parameters of the mobile device along different axes (such as X, Y, Z, as an example). For the sake of simplicity of explanation, FIG. 3 illustrates the described memory structure for a single channel, for example, for a data channel along the X-axis, of the sensor 320 being, for example, the gyroscope. The stacks are organized and used completely in the same way for the rest of the channels and for the rest of the sensors.

The start stack 312 is organized as a pushup first-in, first-out (FIFO) stack, and its length is pre-selected and can comprise, for example, 50 values (or any other number; the value 50 will be used for illustrative purposes only).

Further, according to certain non-limiting embodiments of the present technology, the action stack 314 can have a much greater length that is obviously sufficient to accommodate all values that are returned during a period of the given occurrence of the synchronization event 302, for example, a screen touching. For example, the length of the action stack 314 may be selected as 5000 values.

Unlike the start stack, the final stack 316 can be organized without updating its values. A length of the final stack 316 can also be selected as equal to a pre-selected parameter, for example, 50 values. In this case, by "organized without updating", it is meant, inter alia, that when this stack is filled with the values, recording to this stack will be stopped.

Thus, according to certain non-limiting embodiments of the present technology, the mobile device can be caused to poll the sensor 320, and the start stack 312 is being filled with values that are returned by the sensor 320 until the given occurrence of the synchronization event 302 (that is, for example, until a user 399 touches the touchscreen of the smartphone 220). The fact that the synchronization event 302 has not occurred yet at a first moment 301 is determined based on a state of a flag 330 (schematically depicted as a checkbox in FIG. 3) that indicates a tapping on the touchscreen of the mobile device. At the first moment 301, the tapping on the touchscreen has not occurred yet, so the flag 330 is not set, i.e., it has the value '0'.

As mentioned above, the start stack 312 is organized as a pushup stack, so upon receipt of each next value having an ordinal number that exceeds the length of the start stack, for example, a 51st value, all the content of the start stack 312 will be one step displaced from its end to its beginning: 2nd value will be recorded instead of 1st value, 3rd value will be recorded instead of 2nd value and so on, while 50th value will be recorded instead of 49th value, and the received 51st value will be recorded instead of the 50th value.

Thus, the start stack 312 is being iteratively updated with sensor readings of the sensor 320 until the given occurrence of the synchronization event 302 occurs, that is, for example, until the user 399 touches the touchscreen of the smartphone 220. In this example, the mobile device can be configured to determine the fact of tapping on the screen in response to a signal from the screen tapping sensor that triggers the touchscreen tapping flag 330 at the given occurrence of the synchronization event 302. At the given occurrence of the synchronization event 302, the mobile device can be configured to "freeze" the content of the start stack 312, and record all subsequent values received from the sensor 320 in the action stack 314. Thus, the start stack 312 that has been frozen now stores the last 50 values received from the sensor 320 during a time period that lasted prior to the given occurrence of the synchronization event 302 (i.e., screen tapping).

The values being received from the sensor 320 are recorded in the action stack 314 as long as the given occurrence of the synchronization event 302 lasts (for example, until the user 399 stops tapping on the screen of the smartphone 220). For example, the mobile device can be configured to determine that the screen tapping is stopped in response to a signal of the screen tapping sensor that is indicative of the touchscreen tapping flag 330 being reset (set back to NULL) after the screen tapping is stopped.

Further, at a third moment 303, the given occurrence of the synchronization event 302 may end, and the mobile device can be configured to: (i) freeze the recording to the action stack 314; and (ii) record all subsequent values received from the sensor 320 to the final stack 316.

Since the final stack 316, as mentioned before, may have a fixed length and can be organized without updating its values, the mobile device can be configured to continue the recording to the final stack 316 until the final stack 316 is filled. In other words, the last value, for example, the 50th value of the predetermined number of values for the final stack 316, has been recorded therein, the mobile device can be configured to stop the recording to the final stack 316.

Further, according to certain non-limiting embodiments of the present technology, the mobile device can be configured to store, for the given occurrence of the synchronization event, the sensed data including the values of the start stack 312, the action stack 314, and the final stack 316. For example, the mobile device can be configured to store the so sensed data in a preliminary organized area of the random-access memory 310 of the mobile device, such as the smartphone 220 (this area is not shown in FIG. 3 for the sake of clarity).

After storing the sensed data for the given occurrence of the synchronization event, the mobile device can be configured to: (i) reset all the content of all the start, action, and final stacks 312, 314, and 316 to NULL; unfreeze the recording to the start stack 312; thereby (iii) starting over the recording the sensor readings of the sensor 320 to the start stack 312 as described above.

It should be noted that, in other non-limiting embodiments of the present technology, the synchronization event 302 can comprise the user opening a new window or tab of a graphical user interface (GUI) of the application to which the user has logged in.

In terms of memory organization and receipt of the sensed data, this embodiment is completely analogous to the above-described one. This alternative embodiment differs only in that the beginning of the synchronization event 302, i.e., a signal to "freeze" the start stack 312 and to start recording to the action stack 314, corresponds to opening, by the user, a certain window or tab in the user interface of the application. For example, the mobile device can be configured to execute "freezing" of the start stack 312 and recording to the action stack 314 when the user navigates to "My accounts" or, for example, "Payment History" tab (window).

Similarly, "freezing" of the action stack 314 and recording to the final stack 316 are started when the synchronization event 302 has been completed, i.e., when the user closes this tab (window), for example, when he/she navigates to another window. In this embodiment, the mobile device can be configured to ignore signals from the screen tapping sensor.

In yet other non-limiting embodiments of the present technology, the synchronization event 302 can comprise both the user tapping the touchscreen of the mobile device and opening a new window or tab in the GUI of the application. In other words, the mobile device can be configured to generate the sensed data from the sensor 320 (as will be described below) only if both conditions are met at the same time. For example, as will become apparent from the description provided below, the mobile device can be configured to start generating the sensed data once the user opens a certain window (a tab), for example, "Transfer from account to account", "Transfer by phone number" and "Transfer by card number" in the GUI of the application associated with the server 270. In this example, operations with the touchscreen that are performed by the user in other windows or tabs are not considered.

It should be noted that regardless of a particular embodiment described above, various manipulations with the sensors of the mobile device and results of polling thereof are not "visible" for the user, and they are not displayed in the user interface of the running application (for example, the RBS application) in any way. From the user's perspective, after he/she inputs the credentials in the running application, a usual working session continues, and the user, during this session, for example, checks balances on his/her accounts, makes some payments or transfers, reviews received notifications or advertisements, etc.

As it may become apparent, the user may perform certain manipulations with the device: press screen buttons and other elements of the user interface, make gestures (such as swiping, scrolling, long-tapping etc.), and naturally tilt and move the device in some fashion in order to ensure the convenience of interpreting the information displayed on the screen and performing necessary manipulations with the elements of the user interface.

During all these actions (throughout the present specification, their combination from the moment of inputting the credentials to the moment of closing the application is called a user session), the mobile device is caused to perform the above-described polling of the sensors and storing of the sensed data.

In any case, regardless of the embodiment of the described method, polling of the sensors and collection of the sensed data leads to storage of the received vectors of the sensed data for each of the channels, corresponding to the parameters of the mobile device along different directions (X, Y, Z) of each of the polled sensors in the RAM 310 of the mobile device, and each of these vectors consists of three fragments: a start fragment, an action fragment and a final fragment. Values that are stored in each of these fragments are copied from the start stack 312, the action stack 314 and the final stack 316, respectively.

After storing the sensed data for the given occurrence of the synchronization event 302, the executable instructions transmitted by the server 270 can cause the mobile device to determine, based on the sensed data, collected for the given occurrence of the synchronization event 302, a respective vector of behavioral parameters associated with the user.

It should be noted that although in the description above the steps of polling the at least one available sensor to generate the sensed data, storing the sensed data, and generating, based on the sensed data, the respective vector of behavioral parameters are described as executed sequentially, it is done so solely for the clarity of the present description. In other non-limiting embodiments of the present technology, these steps may be executed in parallel. Also, the mobile device can be caused to execute the step of generating the respective vector of behavioral parameters is regardless of further polling of the sensors and recording or a subsequent portion of the sensed data. Once another portion (set of vectors) of the sensed data is stored, the process proceeds to the generation of the respective vector of behavioral parameters (described below), while at the same time continuing to poll the at least one available sensor to generate a new portion of the sensed data completely in a similar way as described above.

To provide an example of how the mobile device is caused to generate, based on the sensed data for the given occurrence of the synchronization event 302, for clarity of explanation and in no way as a limitation, let it be assumed that the mobile device could be configured to generate the sensed data from four available sensors: the accelerometer, the gyroscope, the gravity sensor, and the screen tapping sensor. In order to ensure unambiguousness of this example, let it be assumed that tapping on the touchscreen of the mobile device was selected as the synchronization event 302 in this case. Thus, the synchronization of the readings of the sensors is performed when the user taps the touchscreen, as described above with reference to FIG. 3; while in order to detect beginning and stoppage of the screen tapping, the screen tapping sensor is used.

In this example, the available sensors of the mobile device return the following data.

The gyroscope (GY) can be configured to return an angular acceleration value along each of the axes X, Y, Z. According to certain non-limiting embodiments of the present technology, these values are used to determine how sharply the user usually turns the mobile device in space during the working session with the RBS application.

The gravity sensor (GS) can be configured to return a value of a gravity vector projection onto each of the axes X, Y, Z. According to certain non-limiting embodiments of the present technology, these values are used to determine a spatial orientation of the mobile device. For example, if the gravity sensor returned a value of 9.8 along the Y-axis at a certain point of time (that is numerically equal to Earth's gravity vector modulus which means that directions of the Y-axis and the Earth's gravity vector coincide in this point of time), while the gravity sensor returned value 0 along the axes X and Z (both X and Z are perpendicular to the direction of the Earth's gravity vector), then it will mean that the device is now located strictly vertically: its screen is perpendicular to the Earth surface, and short sides of its housing are located horizontally and parallel to the Earth surface.

Similarly, based on the readings of the gravity sensor, it may be possible to determine how the mobile device was located relative to a horizontal surface at each point of time: whether it was tilted, turned at a certain angle, located horizontally with the screen faced upwards or downwards.

The accelerometer (AC) can be configured to return an acceleration of the mobile device along each of the axes X, Y, Z. According to certain non-limiting embodiments of the present technology, these values can be used to determine how quickly and how far the user usually moves the mobile device in space during the working session with the application associated with the server 270 (such as the RBS application). For example, he/she usually moved it closer on a table or moved away, performed some gestures with a hand holding the device, etc.

In the provided example, the mobile device can be caused to generate the following portions of the sensed data based on readings of the respective sensors. Indices x, y, z correspond to coordinate axes that will be described below with reference to FIGS. 4A-4B, indices 's', 'a', and 'f' correspond to the start fragment, the action fragment and the final fragment of the sensed data. In this example, each start fragment (received before the touchscreen tapping) and each final fragment (received after the touchscreen tapping) comprises 50 values, the action fragment (received during the entire touchscreen tapping) comprises a certain much greater number of N values:

$$ACxs1, ACxs2, \ldots ACxs50, ACxa1, ACxa2, \ldots ACxaN, ACxf1, ACxf2, \ldots ACxf50\text{—accelerometer, } X\text{-axis,}$$

$$ACys1, ACys2, \ldots ACys50, ACya1, ACya2, \ldots ACyaN, ACyf1, ACyf2, \ldots ACyf50\text{—accelerometer, } Y\text{-axis,}$$

$$ACzs1, ACzs2, \ldots ACzs50, ACza1, ACza2, \ldots ACzaN, ACzf1, ACzf2, \ldots ACzf50\text{—accelerometer, } Z\text{-axis,}$$

$$GYxs1, GYxs2, \ldots GYxs50, GYxa1, GYxa2, \ldots GYxaN, GYxf1, GYxf2, \ldots GYxf50\text{—gyroscope, } X\text{-axis,}$$

$$GYys1, GYys2, \ldots GYys50, GYya1, GYya2, \ldots GYyaN, GYyf1, GYyf2, \ldots GYyf50\text{—gyroscope, } Y\text{-axis,}$$

$$GYzs1, GYzs2, \ldots GYzs50, GYza1, GYza2, \ldots GYzaN, GYzf1, GYzf2, \ldots GYzf50\text{—gyroscope, } Z\text{-axis,}$$

$$GSxs1, GSxs2, \ldots GSxs50, GSxa1, GSxa2, \ldots GSxaN, GSxf1, GSxf2, \ldots GSxf50\text{—gravity sensor, } X\text{-axis,}$$

$$GSys1, GSys2, \ldots GSys50, GSya1, GSya2, \ldots GSyaN, GSyf1, GSyf2, \ldots GSyf50\text{—gravity sensor, } Y\text{-axis,}$$

$$GSzs1, GSzs2, \ldots GSzs50, GSza1, GSza2, \ldots GSzaN, GSzf1, GSzf2, \ldots GSzf50\text{—gravity sensor, } Z\text{-axis.} \quad (1)$$

According to certain non-limiting embodiments of the present technology, the mobile device can be caused to generate, based on the sensed data for the given occurrence of the synchronization event 302, the respective vector of behavioral parameters including at least one of:

a vector of amplitudes that are taken by each of the readings of the accelerometer and the gyroscope in a three-dimensional space:

$$ACampS1, ACampS2, \ldots ACampS50, ACampA1, ACampA2, \ldots ACampAN, ACampF1, ACampF2, \ldots ACampF50,$$

$$GYampS1, GYampS2, \ldots GYampS50, GYampA1, GYampA2, \ldots GYampAN, GYampF1, GYampF2, \ldots GYampF50,$$

where $$ACamp_i = \sqrt{ACxi^2 + ACyi^2 + ACzi^2}$$

$$GYamp_i = \sqrt{GYxi^2 + GYyi^2 + GYzi^2}$$

$a_i$ – index of a one–dimensional array that is represented by the vector,

As it can be appreciated, mathematically, the parameter that is referred to as amplitude in (2) is a modulus of the vector that joins the point of origin (x=0, y=0, z=0) and a point in the space that corresponds to the current readings of the sensor along each of the axes (for example, ACxi, ACyi, ACzi). In the context of the present specification, this parameter is called amplitude, because it characterizes an amplitude (a scale) of a physical movement or turn of the mobile device that occurred at the moment of receiving these sensor readings.

a minimum value of the readings of the accelerometer, the gyroscope, and the gravity sensor within sensed data expressed by Equation (1), and the amplitude of readings of the accelerometer and the gyroscope (2):

$$\begin{aligned}
&ACX\min = \min\{ACxs1, ACxs2, \ldots ACxs50,\\
&ACxa1, ACxa2, \ldots ACxaN, ACxf1, ACxf2, \ldots ACxf50\},\\
&ACY\min = \min\{ACys1, ACys2, \ldots ACys50,\\
&ACya1, ACya2, \ldots ACyaN, ACyf1, ACyf2, \ldots ACyf50\}\\
&ACZ\min = \min\{ACzs1, ACzs2, \ldots ACzs50,\\
&ACza1, ACza2, \ldots ACzaN, ACzf1, ACzf2, \ldots ACzf50\}\\
&ACamp.\min = \min\{ACampS1, ACampS2, \ldots ACampS50, ACampA1,\\
&ACampA2, \ldots ACampAN, ACampF1, ACampF2, \ldots ACampF50\},\\
&GYX\min = \min\{GYxs1, GYxs2, \ldots GYxs50,\\
&GYxa1, GYxa2, \ldots GYxaN, GYxf1, GYxf2, \ldots GYxf50\},\\
&GYY\min = \min\{GYys1, GYys2, \ldots GYys50,\\
&GYya1, GYya2, \ldots GYyaN, GYyf1, GYyf2, \ldots GYyf50\}\\
&GYZ\min = \min\{GYzs1, GYzs2, \ldots GYzs50,\\
&GYza1, GYza2, \ldots GYzaN, GYzf1, GYzf2, \ldots GYzf50\}\\
&GYamp.\min = \min\{GYampS1, GYampS2, \ldots GYampS50, GYampA1,\\
&GYampA2, \ldots GYampAN, GYampF1, GYampF2, \ldots GYampF50\},\\
&GSX\min = \min\{GSxs1, GSxs2, \ldots GSxs50,\\
&GSxa1, GSxa2, \ldots GSxaN, GSxf1, GSxf2, \ldots GSxf50\},\\
&GSY\min = \min\{GSys1, GSys2, \ldots GSys50,\\
&GSya1, GSya2, \ldots GSyaN, GSyf1, GSyf2, \ldots GSyf50\}\\
&GSZ\min = \min\{GSzs1, GSzs2, \ldots GSzs50,\\
&GSza1, GSza2, \ldots GSzaN, GSzf1, GSzf2, \ldots GSzf50\}
\end{aligned} \tag{3}$$

a maximum value of the readings of the accelerometer, the gyroscope and the gravity sensor within the start fragment of the sensed data (1), and the amplitude of readings of the accelerometer and the gyroscope (2) in the start fragment:

$$\begin{aligned}
&ACX\max S = \max\{ACxs1, ACxs2, \ldots ACxs50\},\\
&ACY\max S = \max\{ACys1, ACys2, \ldots ACys50\}\\
&ACZ\max S = \max\{ACzs1, ACzs2, \ldots ACzs50\}\\
&ACamp.\max S = \max\{ACampS1, ACampS2, \ldots ACampS50\}\\
&GYX\max S = \max\{GYxs1, GYxs2, \ldots GYxs50\},\\
&GYY\max S = \max\{GYys1, GYys2, \ldots GYys50\}\\
&GYZ\max S = \max\{GYzs1, GYzs2, \ldots GYzs50\}\\
&GYamp.\max S = \max\{GYampS1, GYampS2, \ldots GYampS50\}\\
&GSX\max S = \max\{GSxs1, GSxs2, \ldots GSxs50\},\\
&GSY\max S = \max\{GSys1, GSys2, \ldots GSys50\}\\
&GSZ\max S = \max\{GSzs1, GSzs2, \ldots GSzs50\}
\end{aligned} \tag{4}$$

a maximum value of the readings of the accelerometer, the gyroscope, and the gravity sensor within the action fragment of the sensed data (1), and the amplitude of the readings of the accelerometer and the gyroscope (2) in the action fragment:

$$\begin{aligned}
&ACX\max A = \max\{ACxa1, ACxa2, \ldots ACxaN\},\\
&ACY\max A = \max\{ACya1, ACya2, \ldots ACyaN\}\\
&ACZ\max A = \max\{ACza1, ACza2, \ldots ACzaN\}\\
&ACamp.\max A = \max\{ACampA1, ACampA2, \ldots ACampAN\}\\
&GYX\max A = \max\{GYxa1, GYxa2, \ldots GYxaN\},\\
&GYY\max A = \max\{GYya1, GYya2, \ldots GYyaN\}\\
&GYZ\max A = \max\{GYza1, GYza2, \ldots GYzaN\}\\
&GYamp.\max A = \max\{GYampA1, GYampA2, \ldots GYampAN\}\\
&GSX\max A = \max\{GSxa1, GSxa2, \ldots GSxaN\},\\
&GSY\max A = \max\{GSya1, GSya2, \ldots GSyaN\}\\
&GSZ\max A = \max\{GSza1, GSza2, \ldots GSzaN\}
\end{aligned} \tag{6}$$

a maximum value of the readings of the accelerometer, the gyroscope, and the gravity sensor within the final fragment of the sensed data (1), and the amplitude of the readings of the accelerometer and the gyroscope (2) in the same fragment:

$$\begin{aligned}
&ACXmaxF = \max\{ACxf1, ACxf2, \ldots ACxf50\},\\
&ACYmaxF = \max\{ACyf1, ACyf2, \ldots ACyf50\},\\
&ACZmaxF = \max\{ACzf1, ACzf2, \ldots ACzf50\},\\
&ACamp.maxF = \max\{ACampF1, ACampF2, \ldots ACampF50\}\\
&GYXmaxF = \max\{GYxf1, GYxf2, \ldots GYxf50\},\\
&GYYmaxF = \max\{GYyf1, GYyf2, \ldots GYyf50\}\\
&GYZmaxF = \max\{GYzf1, GYzf2, \ldots GYzf50\}\\
&GYamp.maxF = \max\{GYampF1, GYampF2, \ldots GYampF50\}\\
&GSXmaxF = \max\{GSxf1, GSxf2, \ldots GSxf50\},
\end{aligned} \tag{6}$$

-continued $$GSYmaxF=\max\{GSyf1, GSyf2, \ldots GSyf50\},$$

$$GSZmaxF=\max\{GSzf1, GSzf2, \ldots GSzf50\}$$

a variance of the readings of the accelerometer, the gyroscope, and the gravity sensor within the entirety of the sensed data (1), and the amplitude of the readings of the accelerometer and the gyroscope (2):

$$\begin{aligned}
ACXvar &= D(ACxs1, ACxs2, \ldots ACxs50, \\
&\quad ACxa1, ACxa2, \ldots ACxaN, ACxf1, ACxf2, \ldots ACxf50), \\
ACYvar &= D(ACys1, ACys2, \ldots ACys50, \\
&\quad ACya1, ACya2, \ldots ACyaN, ACyf1, ACyf2, \ldots ACxf50), \\
ACZvar &= D(ACzs1, ACzs2, \ldots ACzs50, \\
&\quad ACza1, ACza2, \ldots ACzaN, ACzf1, ACzf2, \ldots ACxf50), \\
ACamp.var &= D(ACampS1, ACampS2, \ldots ACampS50, ACampA1, \\
&\quad ACampA2, \ldots ACampAN, ACampF1, ACampF2, \ldots ACampF50) \\
GYXvar &= D(GYxs1, GYxs2, \ldots GYxs50, \\
&\quad GYxa1, GYxa2, \ldots GYxaN, GYxf1, GYxf2, \ldots GYxf50), \\
GYYvar &= D(GYys1, GYys2, \ldots GYys50, \\
&\quad GYya1, GYya2, \ldots GYyaN, GYyf1, GYyf2, \ldots GYyf50), \\
GYZvar &= D(GYzs1, GYzs2, \ldots GYzs50, \\
&\quad GYza1, GYza2, \ldots GYzaN, GYzf1, GYzf2, \ldots GYzf50), \\
GYamp.\mathrm{var} &= D(GYampS1, GYampS2, \ldots GYampS50, GYampA1, \\
&\quad GYampA2, \ldots GYampAN, GYampF1, GYampF2, \ldots GYampF5) \\
GSXvar &= D(GSxs1, GSxs2, \ldots GSxs50, \\
&\quad GSxa1, GSxa2, \ldots GSxaN, GSxf1, GSxf2, \ldots GSxf50), \\
GSYvar &= D(GSys1, GSys2, \ldots GSys50, \\
&\quad GSya1, GSya2, \ldots GSyaN, GSyf1, GSyf2, \ldots GSyf50) \\
GSZvar &= D(GSzs1, GSzs2, \ldots GSzs50, \\
&\quad GSza1, GSza2, \ldots GSzaN, GSzf1, GSzf2, \ldots GSzf50)
\end{aligned} \tag{7}$$

For example, the mobile device can be caused to determine the variance as a random variable variance based on all sensor readings in the sensed data (1).

a standard deviation of the readings of the accelerometer, the gyroscope, and the gravity sensor within the entirety of the sensed data (1), and of the amplitude of the readings of the accelerometer and the gyroscope:

$$\begin{aligned}
ACXstd &= \left|\sqrt{ACXvar}\right| \\
ACYstd &= \left|\sqrt{ACYvar}\right| \\
ACZstd &= \left|\sqrt{ACZvar}\right| \\
ACamp.std &= \left|\sqrt{ACamp.var}\right| \\
GYXstd &= \left|\sqrt{GYXvar}\right| \\
GYYstd &= \left|\sqrt{GYYvar}\right| \\
GYZstd &= \left|\sqrt{GYZvar}\right|
\end{aligned} \tag{8}$$

-continued $$\begin{aligned}
GYamp.std &= \left|\sqrt{GYamp.var}\right| \\
GSXstd &= \left|\sqrt{GSXvar}\right| \\
GSYstd &= \left|\sqrt{GSYvar}\right| \\
GSZstd &= \left|\sqrt{GSZvar}\right|
\end{aligned}$$

an arithmetic mean value of the readings of the accelerometer, the gyroscope, and the gravity sensor within the entirety of the sensed data (1), and of the amplitude of the readings of the accelerometer and the gyroscope (2):

$$\begin{aligned}
ACXmean &= \frac{1}{50+N+50}\sum\{ACxs1, ACxs2, \ldots ACxs50, ACxa1, ACxa2, \\
&\quad \ldots ACxaN, ACxf1, ACxf2, \ldots ACxf50\} \\
ACYmean &= \frac{1}{50+N+50}\sum\{ACys1, ACys2, \ldots ACys50, \\
&\quad ACya1, ACya2, \ldots ACyaN, ACyf1, ACyf2, \ldots ACyf50\} \\
ACZmean &= \frac{1}{50+N+50}\sum\{ACzs1, ACzs2, \ldots ACzs50, \\
&\quad ACza1, ACza2, \ldots ACzaN, ACzf1, ACzf2, \ldots ACzf50\} \\
ACamp.mean &= \\
&= \frac{1}{50+N+50}\sum\{ACampS1, ACampS2, \ldots ACampS50, ACampA1, \\
&\quad ACampA2, \ldots ACampAN, ACampF1, ACampF2, \ldots ACampF50\} \\
GYXmean &= \frac{1}{50+N+50}\sum\{GYxs1, GYxs2, \ldots GYxs50, \\
&\quad GYxa1, GYxa2, \ldots GYxaN, GYxf1, GYxf2, \ldots GYxf50\} \\
GYYmean &= \frac{1}{50+N+50}\sum\{GYys1, GYys2, \ldots GYys50, \\
&\quad GYya1, GYya2, \ldots GYyaN, GYyf1, GYyf2, \ldots GYxf50\} \\
GYZmean &= \frac{1}{50+N+50}\sum\{GYzs1, GYzs2, \ldots GYzs50, \\
&\quad GYza1, GYza2, \ldots GYzaN, GYzf1, GYzf2, \ldots GYzf50\} \\
GYamp.mean &= \\
&\quad \frac{1}{50+N+50}\sum\{GYampS1, GYampS2, \ldots GYampS50, GYampA1, \\
&\quad GYampA2, \ldots GYampAN, GYampF1, GYampF2, \ldots GYampF50\} \\
GSXmean &= \frac{1}{50+N+50}\sum\{GSxs1, GSxs2, \ldots GSxs50, \\
&\quad GSxa1, GSxa2, \ldots GSxaN, GSxf1, GSxf2, \ldots GSxf50\} \\
GSYmean &= \frac{1}{50+N+50}\sum\{GSys1, GSys2, \ldots GSys50, \\
&\quad GSya1, GSya2, \ldots GSyaN, GSyf1, GSyf2, \ldots GSyf50\} \\
GSZmean &= \frac{1}{50+N+50}\sum\{GSzs1, GSzs2, \\
&\quad \ldots GSzs50, GSza1, GSza2, \ldots GSzaN, GSzf1, GSzf2, \ldots GSzf50\}
\end{aligned} \tag{9}$$

a median of the readings of the accelerometer, the gyroscope and the gravity sensor within the entirety of the sensed data (1), and of the amplitude of the readings of the accelerometer and the gyroscope (2):

$$ACXmedian = Me(ACxs1, ACxs2, \ldots ACxs50, ACxa1, ACxa2, \ldots ACxaN, ACxf1, ACxf2, \ldots ACxf50), \quad (10)$$

$$ACYmedian = Me(ACys1, ACys2, \ldots ACys50, ACya1, ACya2, \ldots ACyaN, ACyf1, ACyf2, \ldots ACyf50)$$

$$ACZmedian = Me(ACzs1, ACzs2, \ldots ACzs50, ACza1, ACza2, \ldots ACzaN, ACzf1, ACzf2, \ldots ACzf50)$$

$$ACamp.median = Me(ACampS1, ACampS2, \ldots ACampS50, ACampA1, ACampA2, \ldots ACampAN, ACampF1, ACampF2, ACampF50)$$

$$GYXmedian = Me(GYxs1, GYxs2, \ldots GYxs50, GYxa1, GYxa2, \ldots GYxaN, GYxf1, GYxf2, \ldots GYxf50),$$

$$GYYmedian = Me(GYys1, GYys2, \ldots GYys50, GYya1, GYya2, \ldots GYyaN, GYyf1, GYyf2, \ldots GYyf50)$$

$$GYZmedian = Me(GYzs1, GYzs2, \ldots GYzs50, GYza1, GYza2, \ldots GYzaN, GYzf1, GYzf2, \ldots GYzf50)$$

$$GYamp.median = Me(GYampS1, GYampS2, \ldots GYampS50, GYampA1, GYampA2, \ldots GYampAN, GYampF1, GYampF2, GYampF50)$$

$$GSXmedian = Me(GSxs1, GSxs2, \ldots GSxs50, GSxa1, GSxa2, \ldots GSxaN, GSxf1, GSxf2, \ldots GSxf50),$$

$$GSYmedian = Me(GSys1, GSys2, \ldots GSys50, GSya1, GSya2, \ldots GSyaN, GSyf1, GSyf2, \ldots GSyf50),$$

$$GSZmedian = Me(GSzs1, GSzs2, \ldots GSzs50, GSza1, GSza2, \ldots GSzaN, GSzf1, GSzf2, \ldots GSzf50),$$

The mobile device can be caused to determine the median as a median value of a random variable based on all the respective readings of each available sensor.

Also, in some non-limiting embodiments of the present technology, the respective vector of behavioral parameters can include ratios between the maximum values of the start fragment and the action fragment of the sensed data (1), as well as those of the corresponding amplitudes of the readings of the accelerometer and the gyroscope:

$$ACXmaxS/A = ACXmaxS/ACXmaxA \quad (11)$$

$$ACYmaxS/A = ACYmaxS/ACYmaxA$$

$$ACZmaxS/A = ACZmaxS/ACZmaxA$$

$$ACamp.maxS/A = ACamp.maxS/ACamp.maxA$$

$$GYXmaxS/A = GYXmaxS/GYXmaxA$$

$$GYYmaxS/A = GYYmaxS/GYYmaxA$$

$$GYZmaxS/A = GYZmaxS/GYZmaxA$$

$$GYamp.maxS/A = GYamp.maxS/GYamp.maxA$$

A physical explanation of these ratios is to evaluate changes in the movements of the mobile device (linear and rotational movements around a symmetry axis) after the user touched the touchscreen. If the determined ratios maxS/A are close to one, it is to mean that a nature of the interactions with the mobile device has not changed after touching the screen. The values maxS/A that are close to null will indicate that after touching the screen, the device movements of the mobile device became significantly stronger, while very high values maxS/A that tend to infinity, on the contrary, will indicate that the movements of the mobile device became significantly lower, i.e., they almost terminated, after touching the screen.

Similarly, in some non-limiting embodiments of the present technology, the mobile device can be caused to determine ratios between the maximum values of the final fragment and the action fragment of the sensed data (1), as well as those between the corresponding amplitudes of the readings of the accelerometer and the gyroscope:

$$ACXmaxF/A = ACXmaxF/ACXmaxA \quad (12)$$

$$ACYmaxF/A = ACYmaxF/ACYmaxA$$

$$ACZmaxF/A = ACZmaxF/ACZmaxA$$

$$ACamp.maxF/A = ACamp.maxF/ACamp.maxA$$

$$GYXmaxF/A = GYXmaxF/GYXmaxA$$

$$GYYmaxF/A = GYYmaxF/GYYmaxA$$

$$GYZmaxF/A = GYZmaxF/GYZmaxA$$

$$GYamp.maxF/A = GYamp.maxF/GYamp.maxA$$

A physical explanation of the ratios maxF/A is to evaluate changes in the movements of the device (linear movements and turns around its axis) after the user stopped touching the touchscreen. If the received calculated ratios maxF/A are close to one, it is to mean that a nature of the interactions with the mobile device has not changed after touching the touchscreen stopped. The values maxF/A that are close to null will indicate that after touching the screen stopped, the device movements almost stopped, while very high values maxF/A that tend to infinity, on the contrary, will indicate that the movements of the mobile device became significantly greater after the user stopped touching the screen.

Furthermore, the mobile device can be configured to determine the following values for the readings of the gravity sensor:

a minimum value of the readings of the gravity sensor within the start fragment of sensed data:

$$GSXminS = \min\{GSxs1, GSxs2, \ldots GSxs50\}, \quad (13)$$

$$GSYminS = \min\{GSys1, GSys2, \ldots GSys50\}$$

$$GSZminS = \min\{GSzs1, GSzs2, \ldots GSzs50\}$$

a minimum value of the readings of the gravity sensor within the final fragment of the sensed data:

$$GSXminF = \min\{GSxf1, GSxf2, \ldots GSxf50\}, \quad (14)$$

$$GSYminF = \min\{GSyf1, GSyf2, \ldots GSyf50\}$$

$$GSZminF = \min\{GSzf1, GSzf2, \ldots GSzf50\}$$

a device oscillation reading before touching the touchscreen:

$$
\begin{aligned}
GSXdiffS &= GSXmaxS - GSXminS \\
GSYdiffS &= GSYmaxS - GSYminS \\
GSZdiffS &= GSZmaxS - GSZminS
\end{aligned}
\tag{15}
$$

Values diffS that are close to null are to mean that before the user touched the touchscreen, the mobile device did not change its tilt relative to the axis, for example, it was immovably lying on a table. High values diffS that tend to infinity may indicate that before touching the touchscreen, the tilt of the mobile device along this axis was significantly changed (for example, the user tilted the screen trying to reach a certain element of the user interface with his/her finger).

a device oscillation reading after releasing the touchscreen:

$$
\begin{aligned}
GSXdiffF &= GSXmaxF - GSXminF \\
GSYdiffF &= GSYmaxF - GSYminF \\
GSZdiffF &= GSZmaxF - GSZminF
\end{aligned}
\tag{16}
$$

Similarly, the values diffF that are close to null can indicate that after the user released the finger from the touchscreen, the mobile device remained in a resting position (for example, laid down on the table). Higher values diffF that tend to infinity can indicate that after the user released the finger from the touchscreen, the mobile device experienced a significant tilt along this axis (for example, after the user's finger reached the inconveniently located element of the user interface, the user returned the device to its initial position before the touching occurred).

a device oscillation difference before and after touching the touchscreen:

$$
\begin{aligned}
GSXratioSF &= GSXmaxS/GSXmaxF \\
GSYratioSF &= GSYmaxS/GSYmaxF \\
GSZratioSF &= GSZmaxS/GSZmaxF
\end{aligned}
\tag{17}
$$

The parameter ratioSF can indicate how the tilt of the mobile device has changed: if values have a modulus that is close to one, it can be indicative of the device being approximately in the same position both before and after this screen touching. If the values of ratioSF are close to null, it can indicate that the tilt of the device along a given axis after touching the screen became significantly greater than it was before the touching. Conversely, if the values of ratioSF are great and have a modulus that tends to infinity, it can indicate that after the screen touching is ended, the tilt of the mobile device along the given axis has significantly reduced as compared to the tilt before the touching.

Therefore, as a result of the described calculations, the mobile device can be caused to generate the respective vector of behavioral parameters associated with the user for the given occurrence of the synchronization event 302 which can have the following look:

$$
\begin{aligned}
V = \{&ACXmin, ACYmin, ACZmin, ACamp.min, GYXmin, GYYmin, \\
&GYZmin, GYamp.min, GSXmin, GSYmin, GSZmin, ACXmaxS, \\
&ACYmaxS, ACZmaxS, ACamp.maxS, GYXmaxS, GYYmaxS, \\
&GYZmaxS, GYamp.maxS, GSXmaxS, GSYmaxS, GSYmaxS, \\
&GSZmaxS, ACXmaxA, ACYmaxA, ACZmaxA, ACamp.maxA, \\
&GYXmaxA, GYYmaxA, GYZmaxA, GYamp.maxA, ACXmaxF, \\
&ACYmaxF, ACZmaxF, ACamp.maxF, GYXmaxF, GYYmaxF, \\
&GYZmaxF, GYamp.maxF, GSXmaxF, GSYmaxF, GSZmaxF, \\
&ACXvar, ACYvar, ACZvar, ACamp.var, GYXvar, GYYvar, \\
&GYZvar, GYamp.var, GSYvar, GSZvar, ACXstd, ACYstd, ACZstd, \\
&ACamp.std, GYXstd, GYYstd, GYZstd, GYamp.std, GSXstd, \\
&GSYstd, GSZstd, ACXmean, ACYmean, ACZmean, ACamp.mean, \\
&GYXmean, GYYmean, GYZmean, GYamp.mean, GSXmean, GSYmean, \\
&GSZmean, ACXmedian, ACYmedian, ACZmedian, ACamp.median, \\
&GYXmedian, GYYmedian, GYZmedian, GYamp.median, \\
&GSXmedian, GSYmedian, GSZmedian, ACXmaxS/A, ACYmaxS/A, \\
&ACZmaxS/A, ACamp.maxS/A, GYXmaxS/A, GYYmaxS/A, \\
&GYZmaxS/A, GYamp.maxS/A, ACXmaxF/A, ACYmaxF/A, \\
&ACZmaxF/A, ACamp.maxF/A, GYXmaxF/A, GYYmaxF/A, \\
&GYZmaxF/A, GYamp.maxF/A, GSXminS, GSYminS, GSZminS, \\
&GSXminF, GSYminF, GSZminF, GSXdiffS, GSZdiffS, GSXdiffF, \\
&GSYdiffF, GSZdiffF, GSXratioSF, GSYratioSF, GSZratioSF\}
\end{aligned}
\tag{18}
$$

Further, in a similar way, during the entire working session of the user with the RBS application, the mobile device could be configured to generate other portions of the sensed data for other occurrences of the synchronization event 302, that is, for other touches of the touchscreen or opening new windows or tabs that would occur during the current or subsequent sessions of the user with the application associated with the server 270.

In other non-limiting embodiments of the present technology, where the collection of the sensed data from the sensors is synchronized not with the touches of the touchscreen, but with the synchronization event 302 being the user opening windows or tabs of the user RBS application, the collection and processing of the sensed data are performed in a similar way as described above, with the only difference being that internal signals (statuses) of the RBS application that correspond to opening and closing of various tabs or windows are used instead of the signals from the screen touching sensor.

Referring back to FIGS. 1 and 2, the first phase 100 of the present method hence advances to step 130.

Step 130: Receiving the Vector of Behavioral Parameters

At step 130, according to certain non-limiting embodiments of the present technology, the mobile device can be caused to transmit the respective vector of behavioral parameters V to the server 270 that implements the main functionality of the RBS system. In response, the server 270 can be configured to receive the respective vector of behavioral parameters and store it in the long-term memory of the server 270 in the database 275 or in the "cloud storage" in the external database 280 so as to associate the respective vector of behavioral parameters V with (i) an anonymized identifier of the user (a bank client ID or a hash of the login of this account may serve as the identifier); with (2) this mobile device that may be identified, for example, via IMEI; and (3) as will become apparent from the description provided below, with a respective interaction mode of the user with the mobile device.

The first phased 100 of the present method hence advances to step 140.

Step 140: Aggregating Respective Vectors of Behavioral Parameters Associated with the User and Generated by the at Least One Available Sensor Over Other Occurrences of the Synchronization Event into Behavioral Data At step 140, according to certain non-limiting embodiments of the present technology, the server 270 can be configured to retrieve a data array W stored in the database 275 in the long-term memory of the server 270 or in the cloud storage 280, which comprises a plurality of vectors of behavioral parameters associated with the user, each one of the plurality of vectors of behavioral parameters having been generated for a respective occurrence of the synchronization event 302 described above with reference to (18):

$$W=\{V1,\ V2,\ V3\ \ldots\ Vj\} \tag{19}$$

where j is a number of the occurrence of the synchronization event 302 (screen touches and/or opening of the application windows or tabs) that have occurred during a given working session.

According to certain non-limiting embodiments of the present technology, the server 270 can be configured to generate the array of the behavioral data of this user on this mobile device (19) for a given single working session of the user with the RBS application on the mobile device.

Then, in a similar manner, the server 270 can be configured to generate data arrays for subsequent working sessions of the user with the RBS application on the same mobile device until a pre-determined number of sessions, for example, 10 sessions, is reached.

The first phase 100 hence advances to step 150.

Step 150: Clustering a Given Behavioral Parameter within the Behavioral Data into a Respective Cluster of a Plurality of Clusters Based on a Respective Interaction Mode of a Predetermined Plurality of Interaction Modes of the User with the Mobile Device at a Respective Occurrence of the Synchronization Event, Responsive to which the Given Behavioral Parameter was Generated According to certain non-limiting embodiments of the present technology, at step 150, the server 270 can be configured to cluster the behavioral parameters of the retrieved data arrays associated with the user, such as the data array W defined by Equation (19), according to user interaction modes with the mobile device.

Certain non-limiting embodiments of the present technology are based on a premise that a person's characteristics of fine motor skills, including a manner of holding a certain item by the fingers, as well as touching this item with the fingers, depend largely on a position of the rest of body, as well as on what other tasks are to be accomplished by the person in parallel with interactions performed on the item that is held by the person's fingers.

In particular, as it can be appreciated, finger movements when the user is interacting with the mobile device having the touchscreen will significantly differ depending on a respective position of the user and a respective mode of interaction thereof with the mobile device, that is, (1) lying on his/her back, holding the mobile device in front of their face with the screen faced downwards, or (2) walking, holding the mobile device in front of their face, or (3) sitting at a table while the mobile device lays on the table with its screen faced upwards. Readings of most of the sensors of the mobile device used according to the present method and changes in these readings will significantly vary in these situations.

With reference to FIG. 4C, there are depicted schematic diagrams of example user interaction modes with the mobile device mentioned above.

More specifically, the example interaction modes with the mobile device that are performed by the user depicted in FIG. 4C are defined by a respective position of the user, including a first position 450, that is, lying on the back; a second position 460, that is, a standing position; and a third position 470, that is, sitting at a desk.

It should be expressly understood that the example interaction modes illustrated in FIG. 4C are provided for the purposes of clarity and explanation of the non-limiting embodiments of the present technology; and in some non-limiting embodiments of the present technology, there can be other interactions modes of the user with the mobile device, defined by other respective positions of the user. Also, it should be expressly understood that in other non-limiting embodiments of the present technology the interaction modes with the mobile device may not have to be defined by the position of the user and can include interaction modes while the mobile device is mounted on a stand, a holder, or a rack configured to receive the mobile device in a respective predetermined position thereof relative to the user.

With continued reference to FIG. 4C and with reference to FIGS. 4A and 4B, there is depicted a spatial model of the mobile device in a coordinate system defined by the axes X, Y, and Z, in accordance with certain non-limiting embodiments of the present technology.

In this case, it should be noted that the position of the axes is fixed relative to the physical housing of the device, rather than relative to external factors such as an Earth surface 410 or a normal 420 to the Earth surface that coincides with a direction of a gravity force vector 430, etc. This is best shown by a comparison of the spatial model of the mobile device in FIG. 4A and FIG. 4B: axes of coordinates with which the readings of the sensors are associated "turn" and "tilt" together with the mobile device, for example, such as the smartphone 220. Such a coordinate system is used in all currently known mobile devices that comprise any position sensors and operate under the control of both Android™ OS and Apple™ iOS™.

For the reasons illustrated above with reference to FIG. 4A and FIG. 4B, in order to determine the device position for clustering, according to certain non-limiting embodiments of the present technology, first, the server 270 can be configured to determine a given device orientation: a portrait orientation as shown in FIG. 4A or an album ("landscape") orientation as shown in FIG. 4B. In order to determine the device orientation, the server 270 can be configured to use arithmetic mean readings of the gravity sensor, namely, GSXmean and GSYmean that are determined as described above with respect to Equation (9).

As illustrated in FIG. 4A, a GSXmean reading 432 geometrically corresponds to the arithmetic mean value of the projection of the gravity force vector 430 onto the X-axis, while a GSYmean reading 436 corresponds to the arithmetic mean value of the projection of the gravity force vector 430 onto the Y-axis. Thus, using trigonometric dependencies, the server 270 can be configured to determine a first angle between the Y-axis and the gravity force vector 430 and a second angle between the X-axis and the gravity force vector 430.

As seen in FIG. 4A, the server 270 can be configured to determine the first angle from a right triangle (in the orientation of FIGS. 4A and 4B), where one of its cathetus is the GSYmean reading 436, while its hypotenuse is the gravity force vector 430, and the value ("length") of the GSYmean is calculated as shown in (9), while the modulus ("length") of the gravity force vector 430 throughout all the calculations is 9.8 (modulus of the gravitational acceleration).

Similarly, the server 270 can be configured to determine the second angle between the X-axis and the gravity force vector 430 from the right triangle (in the orientation of FIGS. 4A and 4B), where one of its cathetus is the GSXmean reading 432, while its hypotenuse is the gravity force vector 430, and the value ("length") of the GSXmean is calculated as shown in (9), while the modulus ("length") of the gravity force vector 430 is 9.8.

Using the so determined values of the first and second angles, the server 270 can be configured to determine the given orientation of the mobile device. As it may become apparent, in the portrait orientation of the device 220 as shown in FIG. 4A, the angle between the X-axis and the gravity force vector 430 will be close to 90 degrees, while the angle between the Y-axis and the gravity force vector 430 will be close to 180 degrees.

In the album ("landscape") orientation of the smartphone 220 as shown in FIG. 4B, the angle between the X-axis and the gravity force vector 430 will be close to zero, while the angle between the Y-axis and the gravity force vector 430 will be close to 90 degrees.

Considering possible inaccuracies in determining the given device orientation, the server 270 can be configured to determine whether the mobile device is in the portrait orientation, for example, when the values of the second angle on the X-axis are in a range from 45 to 135 degrees, and the values of the first angle on the Y-axis are in a range from 135 to 225 degrees. Similarly, when the values of the second angle on the X-axis are in a range from −45 to 45 degrees, and the values of the first angle on the Y-axis are in a range from 45 to 135 degrees, the server 270 can be configured to determine that the mobile device is in the album orientation.

After determining the given orientation of the mobile device, in order to determine the spatial position of the mobile device or in order to determine the respective interaction mode with, in some non-limiting embodiments of the present technology, the server 270 can be configured to determine a tilt degree of the mobile device. To do so, the server 270 can be configured to use a GSZmean parameter that is calculated as described by Equation (9) and that corresponds to the arithmetic mean value of the projection of the gravity force vector 430 onto the Z-axis.

In order to determine the tilt degree, as shown in FIG. 4B, according to certain non-limiting embodiments of the present technology, the server 270 can be configured to determine an angle between the Z-axis and the gravity force vector 430 in a similar fashion as described above. This vector is the hypotenuse of the right triangle, while the known GSZmean parameter is one of its catheti.

Depending on the calculated value of the angle on the Z-axis, the server 270 can be configured to determine the respective spatial position of the mobile device. For example, when the angle has values from 0 to 80 degrees, the server 270 can be configured to determine that the mobile device is located with its screen faced downwards (which corresponds to the first position 450 of the user illustrated in FIG. 4C), when the values are from 80 to 140 degrees, the server 270 can be configured to determine that the mobile device is located in a more or less vertical fashion, which corresponds to the second position 460 of the user. Finally, when the values are from 140 to 179 degrees, the server 270 can be configured to determine that the mobile device is located with its screen faced upwards, which corresponds to the third position 470 of the user relative to the mobile device.

It should be noted that the number of the interaction modes with the mobile device is not limited to those defined by the first, second, and third positions 450, 460, and 470 of the user; and other values of the angle values on the Z-axis corresponding to other interaction modes are envisioned.

Alternatively, for determining the respective interaction mode with the mobile device, the server 270 can be configured to use median values (GSXmedian, GSYmedian, GSZmedian) of the readings of the gravity sensor as expressed by Equation (10)

Thus, by doing so, the server 270 can be configured to generate from one to three clusters C, each comprising data arrays that are obtained when the user had the working session with the RBS system in the lying (l), standing (st) or sitting(s) position, as an example:

$$
\begin{aligned}
&Cl = \{0\} \qquad (20)\\
&Cst\{W3,\ W4,\ \ldots\ W9\}\\
&Cs = \{W1,\ W2,\ W10\}
\end{aligned}
$$

In the example expressed by Equation (20), the user has worked with the RBS system on the mobile device either in the second position 460 or in the third position 470, and never in the first position 450 hence the first cluster remained empty. Further, the server 270 can be configured to store the so determined clusters of the behavioral parameters associated with the user.

The so determine clusters of behavioral parameters associated with the user, each of which is associated with the respective interaction mode of the user with the mobile device can thus define a behavioral profile of the user with the mobile device.

The first phase 100 hence advances to step 160.

Step 160: Training, Based on Behavioral Parameters of the Respective Cluster, a Given Classifier to Determine Whether In-Use User Interactions with the Mobile Device are Performed by the User or not At step 160, according to certain non-limiting embodiments of the present technology, the server 270 can be configured to train a respective classifier for each of the non-empty clusters using the data arrays Wi to determine suspicious activity on the mobile device for each interaction mode therewith. According to certain non-limiting embodiments of the present technology, the respective classifiers can be of a similar type, such as a OneClass Support Vector Machine (SVM) classifier. However, training/using classifiers of different types for determining the suspicious activity on the mobile device for each different interaction mode therewith is also envisioned without departing from the scope of the present technology.

The first phase 100 of the present method hence advances to step 170.

Step 170: Storing, in a Database, the Given Classifier in Association with the User Identification Data of the User, the Device Identifier of the Mobile Device, and the Respective Interaction Mode Associated with the Given Classifier for Further Use in Detecting a Suspicious Activity on the Mobile Device At step 170, according to certain non-limiting embodiments of the present technology, the server 270 can be configured to store the trained classifiers in the database 275 in the long-term memory of the server 270 hosting the RBS system so as to associate each trained classifier with: (1) the anonymized identifier of the user (a bank client ID or a hash of the login of this account may serve as the identifier), (2) the device identifier of this mobile device, which, in the present example, is one of the devices 210-230, (3) a respective interaction mode therewith, and (4) the type of the synchronization event 302 (touching the touchscreen, opening a certain application window, etc.).

Alternatively, the server 270 can be configured to store the trained classifiers in the external database 280.

The first phase 100 of the present method thus terminates.

Now, with continued reference to FIG. 1, FIG. 2, and with reference to FIG. 5, there is depicted a flowchart diagram of a second phase 500 of the present method for using the trained classifiers to determine the suspicious activity on the mobile device, in accordance with certain non-limiting embodiments of the present technology.

Step 510: Causing the Mobile Device to Generate an In-Use Vector of Behavioral Parameters The second phase 500 of the present method commences at step 510 with the server 270 causing the mobile device to generate an in-use vector of behavioral parameters. To that end, first, the server 270 can be configured to cause, by transmitting respective executable instructions, the mobile device to transmit user credentials yet, as described above. In response to receiving the user identification data of the user, the server 270 can be configured to determine whether a behavioral profile has been pre-generated for the (legitimate) user of the mobile.

If the behavioral profile is present, according to certain non-limiting embodiments of the present technology, the server 270 can be configured to cause the mobile device to poll the same sensors as those involved when building the behavioral profile, wherein the polling of each of the sensors is synchronized with the synchronization event 302 of the same type as that used for building the profile to generate in-use sensed data. This is performed in similar way to how it was described with respect to step 120 of the first phase 100 of the present method.

Further, the server 270 can be configured to cause the mobile device to generate, based on the in-use sensed data, the in-use vector of behavioral parameters for a given in-use occurrence of the synchronization event 302 in a similar manner as described above with respect to step 120 of the first phase 100.

The second phase 500 hence advances to step 520.

Step 520: Based on the In-Use Vector of Behavioral Parameters, Determining, a Current Interaction Mode of the Predetermined Plurality of Interaction Modes with the Mobile Device At step 550, according to certain non-limiting embodiments of the present technology, the server 270 can be configured to determine, based on the in-use vector of behavioral parameters, a current interaction mode with the mobile device. To do so, as it can be appreciated, the server 270 can be configured to analyze the in-use vector of behavioral parameters, as described above with the example of GSXmean, GSYmean, GSZmean with respect to step 140 of the first phase 100. In other words, in the provided example, as described above, the server 270 can be configured to determine the spatial position of the mobile device and whether a current user of the mobile device is in one of the first, second, and third position 450, 460, and 470 mentioned above.

The second phase 500 hence advances to step 530.

Step 530: Searching the Database to Identify a Respective Classifier Corresponding to the Current Interaction Mode with the Mobile Device At step 530, based on the current mode of interaction determined at step 520, the server 270 can be configured to identify, in the database 275 or from the external database 280, the respective trained classifier that corresponds to the current interaction mode of the current user with the mobile device.

The second phase 500 of the present method hence advances to step 540.

Step 540: In Response to Failing to Identify the Respective Classifier Corresponding to the Current Interaction Mode: Determining the Current Activity on the Mobile Device as being Suspicious; and Causing Execution of Remedial Actions Against the Suspicious Activity At step 540, in response to failing to identify the trained classifier corresponding to the current interaction mode with the mobile device, determined at step 520, in some non-limiting embodiments of the present technology, the server 270 can be configured to determine that the current activity on the mobile device is suspicious. In other words, the server 270 can be configured to determine that the current user is different from the legitimate user of the mobile device.

In response to this, according to certain non-limiting embodiments of the present technology, the server 270 can be configured to cause execution of remedial actions. According to certain non-limiting embodiments of the present technology, in case where the application associated with the server 270 is a RBS application, the remedial actions can comprise, without limitation, one of transmitting warning messages to a security service of the bank, decreasing a bank security rating of the user, blocking all or some of the transactions of the user.

The second phase 500 of the present method hence advances to step 550.

Step 550: In Response to Identifying the Respective Classifier Corresponding to the Current Interaction Mode: Applying the Respective Classifier to the In-Use Vector of Behavioral Parameters to Generate a Likelihood Value Representative of a Likelihood of the Current Activity being Suspicious; in Response to the Likelihood Value being Greater than a Predetermined Likelihood Threshold: Determining the Current Activity on the Mobile Device as being Suspicious; and Causing Execution of the Remedial Actions Against the Suspicious Activity At step 550, in response to identifying the respective trained classifier corresponding to the current interaction mode with the mobile device, determined at step 520, the server 270 can be configured to feed the in-use vector of behavioral parameters to the respective trained classifier. In response, the respective trained classifier can be configured to generate a likelihood value (such as from 0 to 1) representative of whether the current activity on the mobile device is suspicious or not.

Further, the server 270 can be configured to compare the determined likelihood value with a predetermined likelihood threshold, which can be, for example 0.75, 0.80, or 0.95, as an example. In response to determining that the determined likelihood value is greater than or equal to the predetermined likelihood threshold, the server 270 can be configured to determine that the current user activity are similar to that defined by the behavioral profile associated with the user. In other words, the server 270 can be configured to determine that the current user of the mobile device is the legitimate user thereof, based on activity of which the classifiers have been trained according to the first phase 100 of the present method described above.

By contrast, if the server 270 determines that the determined likelihood value is lower than the predetermined likelihood threshold, the server 270 can be configured to determine the current activity on the mobile device as being suspicious, different from a usual manner of interacting with the mobile device. In other words, the server 270 can be configured to determine that the current user of the mobile device is different from the legitimate. For example, this is possible if the mobile device has been stolen by an intruder Also, in some non-limiting embodiments of the present technology, the server 270 can be configured to determine the current activity as being suspicious if it is determined that the mobile device is being controlled remotely. For example, the server 270 can be configured to determine that the mobile device is controlled remotely if the mobile device either remains in a resting position or experience movements that are not usual for the working session with the application. This may be the case, for example, if the intruder installed a remote operation software on the mobile device and remotely connected to the device via the Internet connection.

If the server 270 has not determined the current activity as being suspicious, in some non-limiting embodiments of the present technology, the server 270 can be configured to execute the steps 510 to 550 during the entire working session of the current user with the application on the mobile device.

However, in response to determining the current activity on the mobile device as being suspicious, according to certain non-limiting embodiments of the present technology, the server 270 can be configured to cause executing of the remedial actions mentioned above.

The second phase 500 of the present method and the present method itself thus terminate.

Computing Environment

With reference to FIG. 6, there is depicted an example functional diagram of the computing environment 600 configurable to implement certain non-limiting embodiments of the present technology including the first and second phases 100, 500 of the present method described above.

In some non-limiting embodiments of the present technology, the computing environment 600 may include: the processor 601 comprising one or more central processing units (CPUs), at least one non-transitory computer-readable memory 602 (RAM), a storage 603, input/output interfaces 604, input/output means 605, data communication means 606.

According to some non-limiting embodiments of the present technology, the processor 601 may be configured to execute specific program instructions the computations as required for the computing environment 600 to function properly or to ensure the functioning of one or more of its components. The processor 601 may further be configured to execute specific machine-readable instructions stored in the at least one non-transitory computer-readable memory 602, for example, those causing the computing environment 600 to execute the first and second phases 100, 500 of the present method described above.

In some non-limiting embodiments of the present technology, the machine-readable instructions representative of software components of disclosed systems may be implemented using any programming language or scripts, such as C, C++, C #, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 602 may be implemented as RAM and contains the necessary program logic to provide the requisite functionality.

The storage 603 may be implemented as at least one of an HDD drive, an SSD drive, a RAID array, a network storage, a flash memory, an optical drive (such as CD, DVD, MD, Blu-ray), etc. The storage 603 may be configured for long-term storage of various data, for example, the aforementioned documents with user data sets, databases with the time intervals measured for each user, user IDs, etc.

The input/output interfaces 604 may comprise various interfaces, such as at least one of USB, RS532, RJ45, LPT, COM, HDMI, PS/2, Lightning, Fire Wire, etc.

The input/output means 605 may include at least one of a keyboard, joystick, (touchscreen) display, projector, touchpad, mouse, trackball, stylus, speakers, microphone, and the like. A communication link between each one of the input/output means 605 can be wired (for example, connecting the keyboard via a PS/2 or USB port on the chassis of the desktop PC) or wireless (for example, via a wireless link, for example, radio link, to the base station, which is directly connected to the PC, for example, to a USB port).

The data communication means 606 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 600 may be linked together using a common data bus 610.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for identifying a user of a mobile device, the method being executable by one or more server communicatively coupled with the mobile device, the method comprising:

at a first moment in time, receiving (i) user identification data of the user including: a user login and a user password associated with the user; and (ii) a device identifier of the mobile device;

at a second moment in time, following the first moment in time, transmitting executable instructions to the mobile device, thereby causing the mobile device to generate sensed data indicative of user interactions of the user with the mobile device, by executing:

retrieving a list of sensors available on the mobile device;

selecting, from the list of sensors, at least one available sensor;

recording, in a first stack within a memory of the mobile device, current readings from the at least one sensor;

iteratively polling the at least one available sensor for a given occurrence of a synchronization event;

receiving the given occurrence of the synchronization event;

ceasing to record the current readings from the at least one sensor in the first stack, thereby generating a first plurality of readings;

continuing to record, in a second stack within the memory of the mobile device, further current readings from the at least one sensor;

receiving an indication of the synchronization event having ended:

ceasing to record the further current readings in the second stack, thereby generating a second plurality of readings; and continuing to record, in a third stack within the memory of the mobile device, yet further current readings from the at least one sensor, thereby generating a third plurality of readings;

combining the first, second, and third plurality of readings of the sensed data to generate a vector of behavioral parameters; and transmitting the vector of behavioral parameters to the one or more server;

receiving the vector of behavioral parameters;

aggregating respective vectors of behavioral parameters associated with the user and generated by the at least one available sensor over other occurrences of the synchronization event into behavioral data;

clustering a given behavioral parameter within the behavioral data into a respective cluster of a plurality of clusters based on a respective interaction mode of a predetermined plurality of interaction modes of the user with the mobile device at a respective occurrence of the synchronization event, responsive to which the given behavioral parameter was generated;

training, based on behavioral parameters of the respective cluster, a given classifier to determine whether in-use user interactions with the mobile device are performed by the user or not; and storing, in a database, the given classifier in association with the user identification data of the user, the device identifier of the mobile device, and the respective interaction mode associated with the given classifier for further use in detecting a suspicious activity on the mobile device.

2. The method of claim 1, wherein the at least one available sensor of the mobile device is one of:

an accelerometer;

a gyroscope; and a gravity sensor.

3. The method of claim 1, wherein the synchronization event comprises the user tapping on a touchscreen of the mobile device.

4. The method of claim 1, wherein the synchronization event comprises one of opening a new window in an application interface, in which the user has input the user login and the user password.

5. The method of claim 1, the synchronization event comprises both of the user tapping on a touchscreen of the mobile device and opening a new window in an application interface, in which the user has input the user login and the user password.

6. The method of claim 1, wherein to generate the sensed data, the method further comprises causing the mobile device to execute:

retrieving first data sensed by the at least available sensor prior to a given occurrence of the synchronization event;

retrieving second data sensed by the at least available sensor during the given occurrence of the synchronization event; and retrieving third data sensed by the at least available sensor after the given occurrence of the synchronization event.

7. The method of claim 1, wherein the vector of behavioral parameters includes one or more of:

a minimum value (min) of sensor readings of the at least one available sensor in an entirety of the sensed data;

a minimum value among amplitudes (amp·min) of the sensor readings in the entirety of the sensed data;

a minimum value (minS) of the sensor readings of the at least one available sensor in the sensed data sensed prior to the given occurrence of the synchronization event;

a minimum value (minF) of the sensor readings of the at least one available sensor in the sensed data sensed after the given occurrence of the synchronization event;

a maximum value (maxS) of the sensor readings of the at least one available sensor in the sensed data sensed prior to the given occurrence of the synchronization event;

a maximum value among the amplitudes (amp·maxS) of the sensor readings of the at least one available sensor in the sensed data sensed prior to the given occurrence of the synchronization event;

a maximum value (maxA) of the sensor readings of the at least one available sensor in the sensed data sensed during the given occurrence of the synchronization event;

a maximum value among the amplitudes (amp·maxA) of the sensor readings of the at least one available sensor in the sensed data sensed during the given occurrence of the synchronization event;

a maximum value (maxF) of the sensor readings of the at least one available sensor in the sensed data sensed after the given occurrence of the synchronization event;

a maximum value among the amplitudes (amp·maxF) of the sensor readings of the at least one available sensor in the sensed data sensed after the given occurrence of the synchronization event;

a variance (var) of the sensor readings of the at least one available sensor in the entirety of the sensed data;

a variance of the amplitudes (amp·var) of the sensor readings of the at least one available sensor in the entirety of the sensed data;

a standard deviation (std) of the sensor readings of the at least one available sensor in the entirety of the sensed data;

a standard deviation of the amplitudes (amp·std) of the at least one available sensor in the entirety of the sensed data;

an arithmetic mean (mean) of the sensor readings of the at least one available sensor in the entirety of the sensed data;

an arithmetic mean of the amplitudes (amp·mean) of the sensor readings of the at least one available sensor in the entirety of the sensed data;

a median (median) of the sensor readings of the at least one available sensor in the entirety of the sensed data;

a median of the amplitudes (amp·median) of the sensor readings of the at least one available sensor in the entirety of the sensed data;

a ratio between the maximum values of maxS and maxA;

a ratio between the maximum values of amp·maxS and amp·maxA;

a ratio between the maximum values of maxF and maxA;

a ratio between the maximum values of amp·maxF and amp·maxA;

a value of an oscillation parameter of the mobile device prior to the given occurrence of the synchronization event (diffS);

a value of the oscillation parameter of the mobile device after termination of the given occurrence of the synchronization event (diffF); and a difference of the values of the oscillation parameter of the mobile device prior to and after the termination of the given occurrence of the synchronization event (ratioSF).

8. The method of claim 1, wherein the predetermined plurality of interaction modes of the user with the mobile device comprises: (i) a first interaction mode while the user is in a standing position, (ii) a second interaction mode while the user is in a lying position; and (iii) a third interaction mode while the user is in a sitting position.

9. The method of claim 1, further comprising using the given classifier for identifying the user of the mobile device by analyzing a current activity thereon, the using comprising:

causing the mobile device to execute:

iteratively polling the at least one available sensor for generating in-use sensed data for a given in-use occurrence of the synchronization event, the in-use sensed data being indicative of current user interactions with the mobile device;

analyzing the in-use sensed data to generate an in-use vector of behavioral parameters; and transmitting the in-use vector of behavioral parameters to the one or more server;

based on the in-use vector of behavioral parameters, determining a current interaction mode of the predetermined plurality of interaction modes with the mobile device;

searching the database to identify a respective classifier corresponding to the current interaction mode with the mobile device;

in response to failing to identify the respective classifier corresponding to the current interaction mode:

determining the current activity on the mobile device as being suspicious; and causing execution of remedial actions against the suspicious activity;

in response to identifying the respective classifier corresponding to the current interaction mode:

applying the respective classifier to the in-use vector of behavioral parameters to generate a likelihood value representative of a likelihood of the current activity being suspicious;

in response to the likelihood value being greater than a predetermined likelihood threshold:

determining the current activity on the mobile device as being suspicious; and causing execution of the remedial actions against the suspicious activity.

10. The method of claim 1, wherein the clustering the given behavioral parameter is further based on values of an arithmetic mean value (mean) of sensor readings of the at least one available sensor.

11. The method of claim 10, wherein the at least one available sensor is a gravity sensor of the mobile device.

12. The method of claim 11, wherein, prior to the clustering, the method further comprises determining an orientation of a screen of the mobile device as being one of portrait and landscape.

13. The method of claim 1, wherein the clustering the given behavioral parameter is further based on the values of a median (median) of the sensor readings of the at least one available sensor.

14. The method of claim 13, wherein the at least one available sensor is a gravity sensor of the mobile device.

15. The method of claim 14, wherein, prior to the clustering, the method further comprises determining an orientation of a screen of the mobile device as being one of portrait and landscape.

16. A system for identifying a user of a mobile device, the system comprising a server communicatively coupled with the mobile device, the server comprising at least one processor and at least one non-transitory computer-readable memory storing executable instructions, which, when executed by the at least one processor, cause the system to:

at a first moment in time, receive (i) user identification data of the user including: a user login and a user password associated with the user; and (ii) a device identifier of the mobile device;

at a second moment in time, following the first moment in time, transmit executable instructions to the mobile device, thereby causing the mobile device to generate sensed data indicative of user interactions of the user with the mobile device, by executing:

retrieving a list of sensors available on the mobile device;

selecting, from the list of sensors, at least one available sensor;

recording, in a first stack within a memory of the mobile device, current readings from the at least one sensor;

iteratively polling the at least one available sensor for a given occurrence of a synchronization event;

receiving the given occurrence of the synchronization event; ceasing to record the current readings from the at least one sensor in the first stack, thereby generating a first plurality of readings;

continuing to record, in a second stack within the memory of the mobile device, further current readings from the at least one sensor;

receiving an indication of the synchronization event having ended:

ceasing to record the further current readings in the second stack, thereby generating a second plurality of readings; and continuing to record, in a third stack within the memory of the mobile device, yet further current readings from the at least one sensor, thereby generating a third plurality of readings;

combining the first, second, and third plurality of readings of the sensed data to generate a vector of behavioral parameters; and transmitting the vector of behavioral parameters to the one or more server;

receive the vector of behavioral parameters;

aggregate respective vectors of behavioral parameters associated with the user and generated by the at least one available sensor over other occurrences of the synchronization event into behavioral data;

cluster a given behavioral parameter within the behavioral data into a respective cluster of a plurality of clusters based on a respective interaction mode of a predetermined plurality of interaction modes of the user with the mobile device at a respective occurrence of the synchronization event, responsive to which the given behavioral parameter was generated;

train, based on behavioral parameters of the respective cluster, a given classifier to determine whether in-use user interactions with the mobile device are performed by the user or not; and store, in a database, the given classifier in association with the user identification data of the user, the device identifier of the mobile device, and the respective interaction mode associated with the given classifier for further use in detecting a suspicious activity on the mobile device.

* * * * *